United States Patent
Bryll

(10) Patent No.: US 8,917,940 B2
(45) Date of Patent: Dec. 23, 2014

(54) EDGE MEASUREMENT VIDEO TOOL WITH ROBUST EDGE DISCRIMINATION MARGIN

(71) Applicant: Mitutoyo Corporation, Kawasaki-shi, Kanagawa-ken (JP)

(72) Inventor: Robert Kamil Bryll, Bothell, WA (US)

(73) Assignee: Mitutoyo Corporation, Kawasaki-shi (JP)

( * ) Notice: Subject to any disclaimer, the term of this patent is extended or adjusted under 35 U.S.C. 154(b) by 105 days.

(21) Appl. No.: 13/872,041

(22) Filed: Apr. 26, 2013

(65) Prior Publication Data

US 2014/0321731 A1 Oct. 30, 2014

(51) Int. Cl.
 G06K 9/48 (2006.01)
 G06T 7/00 (2006.01)

(52) U.S. Cl.
 CPC ............ G06T 7/0004 (2013.01); G06T 7/0085 (2013.01)
 USPC ........................................................ 382/199

(58) Field of Classification Search
 USPC ........... 348/252, 597, 625; 358/3.15; 382/199
 See application file for complete search history.

(56) References Cited

U.S. PATENT DOCUMENTS

| | | | |
|---|---|---|---|
| 6,542,180 B1 | 4/2003 | Wasserman | |
| 7,324,682 B2 | 1/2008 | Wasserman | |
| 7,454,053 B2* | 11/2008 | Bryll et al. | 382/152 |
| 7,627,162 B2* | 12/2009 | Blanford et al. | 382/141 |
| 7,817,149 B2 | 10/2010 | Tsuge | |
| 8,111,905 B2 | 2/2012 | Campbell | |
| 8,111,938 B2 | 2/2012 | Bryll | |

OTHER PUBLICATIONS

"QVPAK 3D CNC Vision Measuring Machine: Operation Guide," Version 2.0, Manual No. 4911GB, Series No. 359, Mitutoyo Corporation & Micro Encoder Inc., Kanagawa, Japan, Sep. 1996, 86 pages.*

"QVPAK 3D CNC Vision Measuring Machine: User's Guide," Version 7.0, 1st ed., Manual No. 99MCB225A1, Series No. 359, Mitutoyo Corporation & Micro Encoder Inc., Kanagawa, Japan, Jan. 2003, 370 pages.*

* cited by examiner

*Primary Examiner* — Gregory F Cunningham
(74) *Attorney, Agent, or Firm* — Christensen O'Connor Johnson Kindness PLLC

(57) ABSTRACT

A reliable method for discriminating between a plurality of edges in a region of interest of an edge feature video tool in a machine vision system comprises determining a scan direction and an intensity gradient threshold value, and defining associated gradient prominences. The gradient threshold value may be required to fall within a maximum range that is based on certain characteristics of an intensity gradient profile derived from an image of the region of interest. Gradient prominences are defined by limits at sequential intersections between the intensity gradient profile and the edge gradient threshold. A single prominence is allowed to include gradient extrema corresponding to a plurality of respective edges. A gradient prominence-counting parameter is automatically determined that is indicative of the location of the selected edge in relation to the defined gradient prominences. The gradient prominence-counting parameter may correspond to the scan direction.

20 Claims, 9 Drawing Sheets

EDGE MEASUREMENT VIDEO TOOL WITH ROBUST EDGE DISCRIMINATION MARGIN

FIELD

The invention relates generally to machine vision inspection systems, and more particularly to robust precise edge location determination for closely spaced edges.

BACKGROUND

Precision machine vision inspection systems (or "vision systems" for short) can be utilized to obtain precise dimensional measurements of inspected objects and to inspect various other object characteristics. Such systems may include a computer, a camera, and optical system, and a precision stage that is movable in multiple directions to allow workpiece inspection. One exemplary prior art system that can be characterized as a general-purpose "off-line" precision vision system is the commercially available QUICK VISION® series of PC-based vision systems and QVPAK® software available from Mitutoyo America Corporation (MAC), located in Aurora, Ill. The features and operation of the QUICK VISION® series of vision systems and the QVPAK® software are generally described, for example, in the QVPAK 3D CNC Vision Measuring Machine User's Guide, published January 2003, and the QVPAK 3D CNC Vision Measuring Machine Operation Guide, published September 1996, each of which is hereby incorporated by reference in their entirety. This type of system is able to use a microscope-type optical system and move the stage so as to provide inspection images of either small or relatively large workpieces at various magnifications.

General purpose precision machine vision inspection systems, such as the QUICK VISION™ system, are also generally programmable to provide automated video inspection. Such systems typically include GUI features and predefined image analysis "video tools" such that operation and programming can be performed by "non-expert" operators. For example, U.S. Pat. No. 6,542,180, which is incorporated herein by reference in its entirety, teaches a vision system that uses automated video inspection including the use of various video tools. Exemplary video tools include edge location tools, which are sometimes referred to as "box tools," which are used to locate an edge feature of a workpiece. For example, commonly assigned U.S. Pat. No. 7,627,162, which is incorporated herein by reference in its entirety, teaches various applications of box tools.

The machine control instructions, including the specific inspection event sequence (i.e., how to acquire each image and how to analyze/inspect each acquired image), are generally stored as a "part program" or "workpiece program" that is specific to the particular workpiece configuration. For example, a part program defines how to acquire each image, such as how to position the camera relative to the workpiece, at what lighting level, at what magnification level, etc. Further, the part program defines how to analyze/inspect an acquired image, for example, by using one or more video tools such as edge/boundary detection video tools.

Video tools (or "tools" for short) and other graphical user interface features may be used manually to accomplish manual inspection and/or machine control operations (in "manual mode"). Their set-up parameters and operation can also be recorded during learn mode in order to create automatic inspection programs or "part programs". Video tools may include, for example, edge/boundary detection tools, auto focus tools, shape or pattern matching tools, dimension measuring tools, and the like.

Various methods are known for locating edge features in workpiece images. For example, various algorithms are known that apply brightness gradient operators to images that include an edge feature to determine its location, e.g., a Canny Edge detector or a differential edge detector. Such edge detection algorithms may be included in the machine vision inspection systems that also use carefully configured illumination and/or special image-processing techniques to enhance brightness gradients or otherwise improve edge location accuracy and repeatability.

Some machine vision systems (e.g., those utilizing the QVPAK® software described above) provide edge location video tools that have adjustable parameters for an edge detection algorithm. In certain implementations, the parameters may initially be determined for an edge on a representative workpiece during a learn mode operation and then utilized during a run mode operation to find the corresponding edge of a similar workpiece. When desirable edge detection parameters are difficult or impossible to determine automatically during the learn mode, the user may choose to adjust the parameters manually. However certain edge detection parameters (e.g., thresholds such as TH, and THS, outlined herein) are considered to be difficult to understand for the majority of users (e.g., relatively unskilled users), and how their adjustment affects a particular edge detection operation is considered difficult to visualize. The adjustments of the parameters may be further complicated by the variety of edge conditions and workpiece materials in part-to-part variations encountered when programming and using general purpose machine vision inspection system. An improved method and system that allows relatively unskilled users to adjust the parameters of edge location video tools so that they can be used to reliably inspect a variety of types of edges would be desirable. More specifically, a method and system are desirable for improving the reliability of edge detection in a region of interest that includes a plurality of edges.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Disclosed herein is a method for improving the reliability of edge detection when discriminating between a plurality of edges in a region of interest of an edge feature video tool included in a machine vision inspection system. The method comprises: providing an edge feature video tool comprising: a region of interest (ROI), edge detection operations governed by a plurality of edge detection parameters including an edge gradient threshold, a profile scan direction and a gradient prominence-counting parameter, and a video tool GUI comprising a region of interest indicator and an edge selection element; placing a workpiece in a field of view of the machine vision inspection system; operating the edge feature video tool to define a ROI including a plurality of edge features in an acquired image of the workpiece; operating the edge feature video tool to select an edge feature within the ROI to be the selected edge that is detected by the edge detection operations of the edge feature video tool; operating the edge feature video tool to determine the profile scan direction and the edge gradient threshold; and operating the edge feature video tool to automatically determine the gradient prominence-counting parameter corresponding to the profile scan direction and edge gradient threshold.

Operating the edge feature video tool to determine edge gradient threshold comprises: operating the edge feature video tool to set the edge gradient threshold within a maximum range having a gradient profile extremum value of the selected edge as one limit and an opposing limit that is not farther from the selected edge extremum value than a limiting one of the two gradient profile neighbor extremum values of the two neighbor extrema that are adjacent to the selected edge extremum along an intensity gradient profile across the selected edge in the region of interest, and that have a polarity opposite to the extremum of the selected edge (e.g., if an extremum is a "peak," the polarity opposite to that extremum is a "valley," and vice versa.) In such a case, the selected edge extremum may thereby be one of the first or last extremum encountered along the determined profile scan direction in its associated gradient prominence.

Operating the edge feature video tool to automatically determine the gradient prominence-counting parameter corresponding to the determined profile scan direction and edge gradient threshold comprises performing automatic operations of the edge feature video tool configured such that the gradient prominence-counting parameter satisfies conditions comprising: (a) gradient prominences are defined by limits along the intensity gradient profile at sequential intersections between the intensity gradient profile and the determined edge gradient threshold, for at least the intersections that are encountered before the selected edge along the determined profile scan direction; (b) a single gradient prominence is allowed to include a plurality of gradient extrema corresponding to a plurality of respective edges along the intensity gradient profile between the limits defined by the condition (a); and (c) the gradient prominence-counting parameter is indicative of the location of the selected edge in relation to the defined gradient prominences. For example, in one embodiment, the gradient prominence-counting parameter is indicative of the gradient prominence that includes the selected edge extremum. In such a case, related signal processing may be used to reliably and robustly locate the selected edge according to principles outlined herein. Concepts related to gradient prominences are described in greater detail below, with reference to the figures herein.

In some embodiments, the limiting one of the two neighbor extremum gradient values (that is, the one that limits the maximum range) is the one that is closest to the gradient profile extremum value of the selected edge. In such a case, the selected edge extremum may thereby be the only extremum encountered in its associated gradient prominence, which may allow good detection reliability with minimal additional signal processing to locate that extremum. In other embodiments, the limiting one of the two neighbor extremum gradient values may be the one that corresponds to the neighbor extremum that is encountered before the selected edge along the determined profile scan direction, regardless of whether it is closest to the to the gradient profile extremum value of the selected edge. In such a case, the selected edge extremum may thereby be the first extremum encountered along the determined profile scan direction in its associated gradient prominence, which may allow good detection reliability with very simple signal processing to locate that extremum.

In other embodiments, the limiting one of the two neighbor extremum gradient values may be the one that corresponds to the neighbor extremum that is encountered after the selected edge along the determined profile scan direction, regardless of whether it is closest to the gradient profile extremum value of the selected edge. In such a case, the selected edge extremum may thereby be the last extremum encountered along the determined profile scan direction in its associated gradient prominence. However, this latter alternative may require relatively more complicated signal processing to locate that extremum, or may be considered less reliable in some applications.

In some embodiments, the edge feature video tool may include operations that automatically prevent the edge gradient threshold from being set to a value within a gradient noise band that includes the gradient value zero. In some such embodiments, when the limiting one of the two gradient profile neighbor extremum values falls within the gradient noise band then the opposing limit of the maximum range is defined to be not farther from the selected edge extremum value than a limit of the gradient noise band that is closest to the selected edge extremum value.

In some embodiments, operating the edge feature video tool to set the edge gradient threshold within the maximum range comprises setting the edge gradient threshold within a robust extremum margin included in the maximum range, wherein the robust extremum margin satisfies defining conditions comprising: (a) the robust extremum margin is limited by first and second gradient extremum values that would be sequential values in a ranked list of gradient extremum values corresponding to gradient extrema in the intensity gradient profile that are included in the maximum range and that are encountered before and including the selected edge along the determined profile scan direction; and (b) the first and second gradient extremum values that limit the robust extremum margin are sequential values that exhibit one of (b1) the largest difference between sequential values in the ranked list, and (b2) a difference that exceeds a minimum margin value defined in the edge feature video tool.

In some embodiments, the edge feature video tool includes operations that are configured to automatically determine a robust extremum margin that satisfies the defining conditions, and the method comprises automatically performing those operations. In some such embodiments, the first and second gradient extremum values that limit the robust extremum margin are the sequential values that exhibit the largest difference between sequential values in the ranked list. In some embodiments, the method further comprises displaying the automatically determined robust extremum margin overlaying a displayed intensity gradient profile in the video tool GUI. In some embodiments, operating the edge feature video tool to set the edge gradient threshold within the robust extremum margin comprises automatically setting the edge gradient threshold within the automatically determined robust extremum margin.

In some embodiments, the operations that are configured to automatically determine the robust extremum margin include determining first and second profile scan direction robust extremum margins that satisfy conditions comprising:

(a) the first profile scan direction robust extremum margin is limited by first and second gradient extremum values that would be sequential values in a first ranked list of gradient extremum values corresponding to gradient extrema in the intensity gradient profile that are encountered before and including the selected edge along the first profile scan direction and that are included in a first maximum range, and the first and second gradient extremum values that limit the first profile scan direction robust extremum margin are the sequential values that exhibit the largest difference between sequential values in the first ranked list; and (b) the second profile scan direction robust extremum margin is limited by first and second gradient extremum values that would be sequential values in a second ranked list of gradient extremum values corresponding to gradient extrema in the intensity gradient profile that are encountered before and including the selected edge along the second profile scan direction and that are included in a second maximum range, and the first and second gradient extremum values that limit the second profile scan direction robust extremum margin are the sequential values that exhibit the largest difference between sequential values in the second ranked list. In some such embodiments, the first maximum range and the second maximum range may be the same maximum range, and the opposing limit of that maximum range is not farther from the selected edge extremum value than the one of the two neighbor extremum gradient values that is closest to the gradient profile extremum value of the selected edge. In other such embodiments, the first maximum range is determined based on the gradient value of a first neighbor extremum that is encountered before the selected edge along the first profile scan direction, and the second maximum range is determined based on the gradient value of a second neighbor extremum that is encountered before the selected edge along the second profile scan direction.

In embodiments that determine first and second profile scan direction robust extremum margins, operating the edge feature video tool to set the edge gradient threshold within the robust extremum margin may further comprise selecting one of the first and second robust extremum margins and setting the edge gradient threshold within the selected one. In such embodiments, operating the edge feature video tool to determine the profile scan direction may comprise setting the profile scan direction to the first profile scan direction when the first robust extremum margin is selected and the second profile scan direction when the second robust extremum margin is selected. In some such embodiments, the method may comprise displaying the first and second robust extremum margins overlaying a displayed intensity gradient profile in the video tool GUI, wherein selecting one of the first and second robust extremum margins comprises manually selecting at least one of (a) one of the displayed first and second edge robust extremum margins, and (b) one of the first and second profile scan directions corresponding to the displayed first and second robust extremum margins. In other such embodiments, selecting one of the first and second robust extremum margins may comprise automatically selecting the larger one of the first and second robust extremum margins, and setting the edge gradient threshold within the selected robust extremum margin may comprise automatically setting the edge gradient threshold within the automatically selected robust extremum margin.

In various embodiments, the method may comprise displaying an edge gradient threshold indicator corresponding to a current value of the edge gradient threshold overlaying a displayed intensity gradient profile in the video tool GUI. In some such embodiments, the displayed edge gradient threshold indicator may be manually adjustable in the video tool GUI, and operating the edge feature video tool to set the edge gradient threshold within the maximum range may comprise manually adjusting the edge gradient threshold indicator. In some embodiments, the method may further comprise indicating the corresponding defined gradient prominences in the video tool GUI, and adjusting the indication of the gradient prominences as the edge gradient threshold indicator is adjusted.

In various embodiments, operating the edge feature video tool to set the edge gradient threshold within the maximum range may comprise automatically setting the edge gradient threshold within the maximum range.

In various embodiments, the method may be performed according to a learn mode of operation, and parameters determined in the method may be saved in a part program for future use on a similar workpiece.

In various embodiments, the video tool GUI may comprise a detection robustness indicator that indicates a degree of risk associated with using the edge feature video tool to detect the selected edge feature based on a current set of the edge detection parameters, and the method may comprise displaying the detection robustness indicator in the video tool GUI. In some such embodiments, the detection robustness indicator may comprise a color associated with an edge gradient threshold indicator displayed in the video tool GUI corresponding to a current magnitude of the robust extremum margin.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
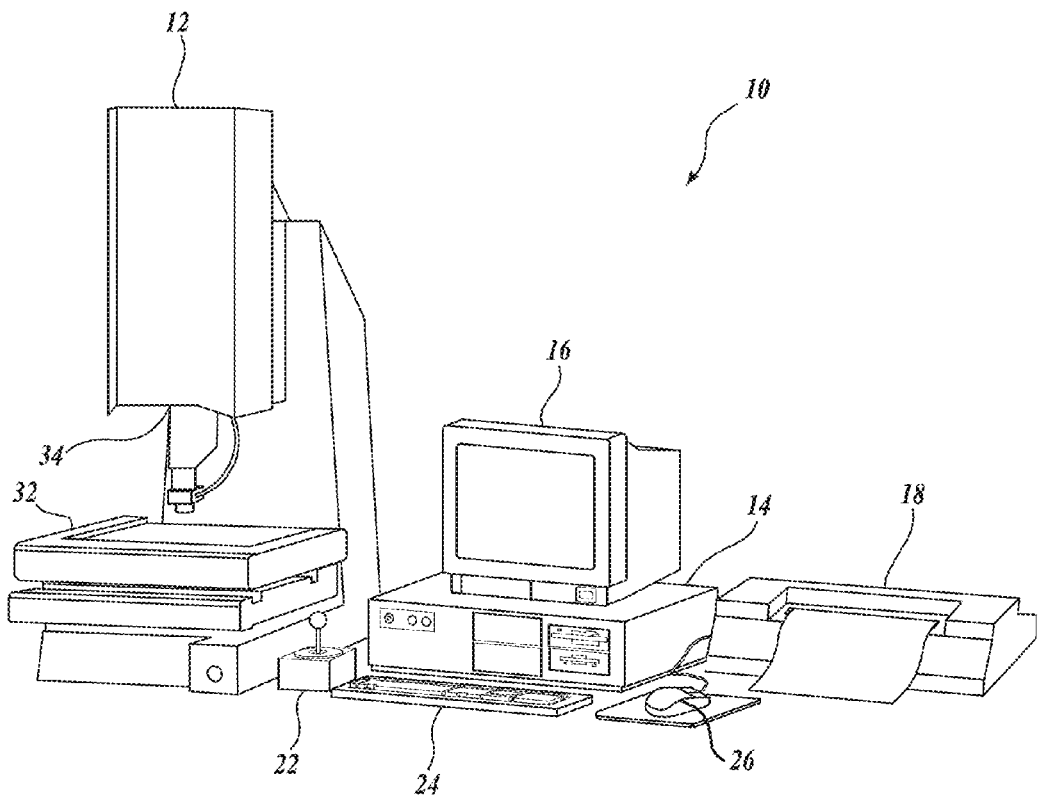
FIG. 1 is a diagram showing various typical components of a general purpose precision machine vision inspection system.

FIG. 1 is a block diagram of one exemplary machine vision inspection system 10 usable in accordance with methods described herein. The machine vision inspection system 10 includes a vision measuring machine 12 that is operably connected to exchange data and control signals with a controlling computer system 14. The controlling computer system 14 is further operably connected to exchange data and control signals with a monitor or display 16, a printer 18, a joystick 22, a keyboard 24, and a mouse 26. The monitor or display 16 may display a user interface suitable for controlling and/or programming the operations of the machine vision inspection system 10. It will be appreciated that in various embodiments, a touchscreen tablet or the like may be substituted for and/or redundantly provide the functions of any or all of the computer system 14, the display 16, the joystick 22, a keyboard 24, and the mouse 26.

Those skilled in the art will appreciate that the controlling computer system 14 may generally consist of any computing system or device. Suitable computing systems or devices may include personal computers, server computers, minicomputers, mainframe computers, distributed computing environments that include any of the foregoing, and the like. Such computing systems or devices may include one or more processors that execute software to perform the functions described herein. Processors include programmable general-purpose or special-purpose microprocessors, programmable controllers, application specific integrated circuits (ASICs), programmable logic devices (PLDs), or the like, or a combination of such devices. Software may be stored in memory, such as random access memory (RAM), read-only memory (ROM), flash memory, or the like, or a combination of such components. Software may also be stored in one or more storage devices, such as magnetic- or optical-based disks, flash memory devices, or any other type of non-volatile storage medium for storing data. Software may include one or more program modules that include routines, programs, objects, components, data structures, and so on that perform particular tasks or implement particular abstract data types. In distributed computing environments, the functionality of the program modules may be combined or distributed across multiple computing systems or devices and accessed via service calls, either in a wired or wireless configuration.

The vision measuring machine 12 includes a moveable workpiece stage 32 and an optical imaging system 34 that may include a zoom lens or interchangeable lenses. The zoom lens or interchangeable lenses generally provide various magnifications for the images provided by the optical imaging system 34. The machine vision inspection system 10 is generally comparable to the QUICK VISION® series of vision systems and the QVPAK® software discussed above and similar state-of-the-art commercially available precision machine vision inspection systems. The machine vision inspection system 10 is also described in commonly assigned U.S. Pat. Nos. 7,454,053, 7,324,682, 8,111,905, and 8,111,938, which are each incorporated herein by reference in their entireties.

Figure 2:
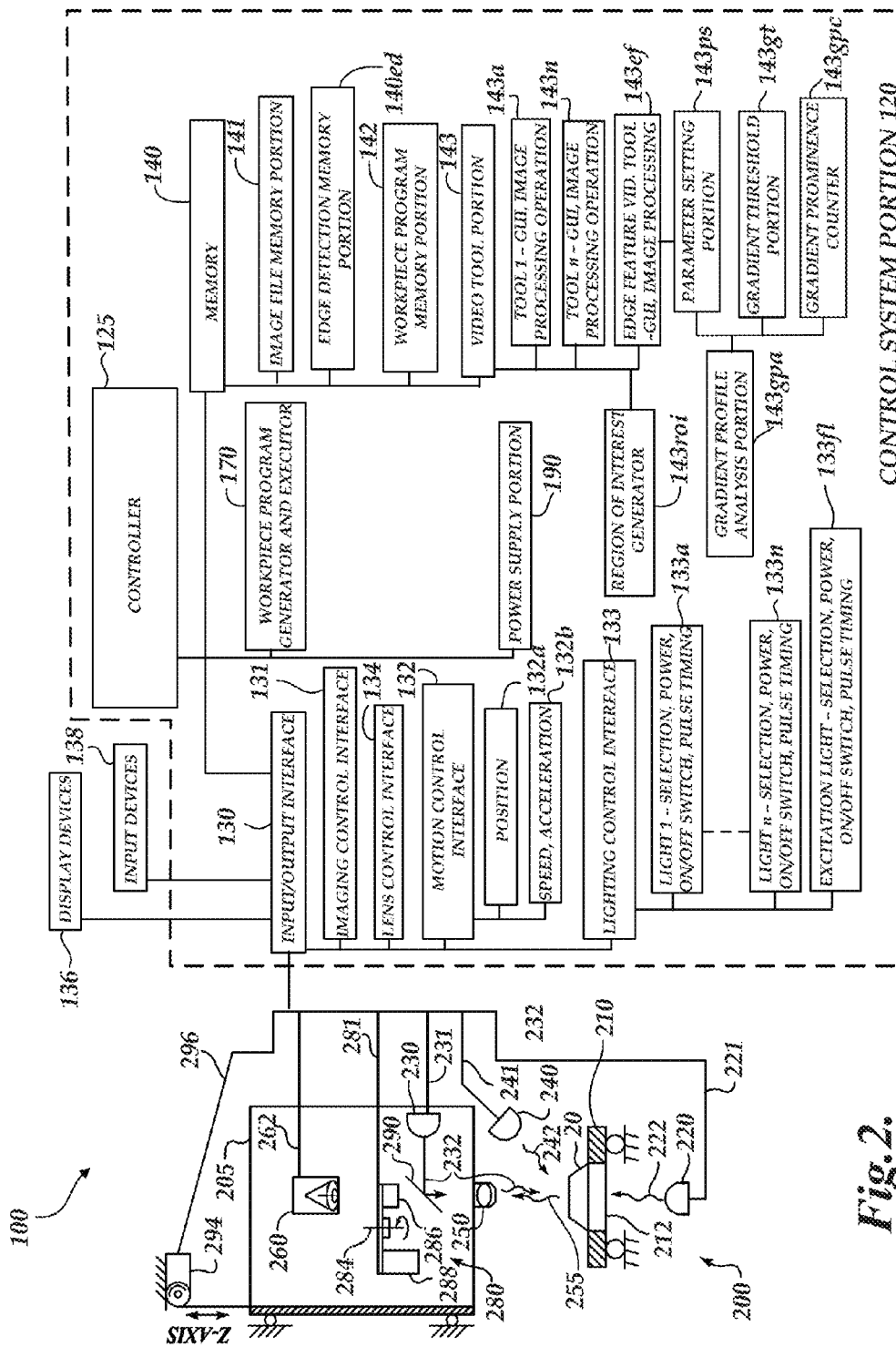
FIG. 2 is a block diagram of a control system portion and a vision components portion of a machine vision inspection system similar to that of FIG. 1 and including features disclosed herein.

FIG. 2 is a block diagram of a control system portion 120 and a vision components portion 200 of a machine vision inspection system 100 similar to the machine vision inspection system of FIG. 1, and including features as described herein. As will be described in more detail below, the control system portion 120 is utilized to control the vision components portion 200. The vision components portion 200 includes an optical assembly portion 205, light sources 220, 230, and 240, and a workpiece stage 210 having a central transparent portion 212. The workpiece stage 210 is controllably movable along X and Y axes that lie in a plane that is generally parallel to the surface of the stage where a workpiece 20 may be positioned. The optical assembly portion 205 includes a camera system 260, an interchangeable objective lens 250, and may include a turret lens assembly 280 having lenses 286 and 288. Alternatively to the turret lens assembly, a fixed or manually interchangeable magnification-altering lens, or a zoom lens configuration, or the like, may be included.

The optical assembly portion 205 is controllably movable along a Z axis that is generally orthogonal to the X and Y axes, by using a controllable motor 294 that drives an actuator to move the optical assembly portion 205 along the Z axis to change the focus of the image of the workpiece 20. The controllable motor 294 is connected to the input/output interface 130 via a signal line 296.

A workpiece 20 or a tray or fixture holding a plurality of workpieces 20, which is to be imaged using the machine vision inspection system 100, is placed on the workpiece stage 210. The workpiece stage 210 may be controlled to move relative to the optical assembly portion 205 such that the interchangeable objective lens 250 moves between locations on a workpiece 20 and/or among a plurality of workpieces 20. One or more of a stage light 220, a coaxial light 230, and a surface light 240 (e.g., a ring light) may emit source light 222, 232, and/or 242, respectively, to illuminate the workpiece or workpieces 20. The light source 230 may emit light 232 along a path including a mirror 290. The source light is reflected or transmitted as workpiece light 255, and the workpiece light used for imaging passes through the interchangeable objective lens 250 and the turret lens assembly 280 and is gathered by the camera system 260. The image of the workpiece(s) 20, captured by the camera system 260, is output on a signal line 262 to the control system portion 120. The light sources 220, 230, and 240 may be connected to the control system portion 120 through signal lines or buses 221, 231, and 241, respectively. To alter the image magnification, the control system portion 120 may rotate the turret lens assembly 280 along axis 284 to select a turret lens, through a signal line or bus 281.

As shown in FIG. 2, in various exemplary embodiments, the control system portion 120 includes a controller 125, the input/output interface 130, a memory 140, a workpiece program generator and executor 170, and a power supply portion 190. Each of these components, as well as the additional components described below, may be interconnected by one or more data/control buses and/or application programming interfaces, or by direct connections between the various elements.

The input/output interface 130 includes an imaging control interface 131, a motion control interface 132, a lighting control interface 133, and a lens control interface 134. The motion control interface 132 may include a position control element 132a and a speed/acceleration control element 132b, although such elements may be merged and/or indistinguishable. The lighting control interface 133 includes lighting control elements 133a-133n, and 133fl that control, for example, the selection, power, on/off switch, and strobe pulse timing, if applicable, for the various corresponding light sources of the machine vision inspection system 100.

The memory 140 may include an image file memory portion 141, an edge detection memory portion 140ed, a workpiece program memory portion 142 that may include one or more part programs, or the like, and a video tool portion 143. The video tool portion 143 includes video tool portion 143a and other video tool portions (e.g., 143n), which determine the GUI, image processing operation, etc., for each of the corresponding video tools, and a region of interest (ROI) generator 143roi that supports automatic, semi automatic and/or manual operations that define various ROIs that are operable in various video tools included in the video tool portion 143.

In the context of this disclosure, and as known by one of ordinary skill in the art, the term video tool generally refers to a relatively complex set of automatic or programmed operations that a machine vision user can implement through a relatively simple user interface (e.g., a graphical user interface, editable parameter windows, menus, and the like) without creating the step-by-step sequence of operations included in the video tool or resorting to a generalized text-based programming language, or the like. For example, a video tool may include a complex pre-programmed set of image processing operations and computations that are applied and customized in a particular instance by adjusting a few variables or parameters that govern the operations and computations. In addition to the underlying operations and computations, the video tool comprises the user interface that allows the user to adjust those parameters for a particular instance of the video tool. For example, many machine vision video tools allow a user to configure a graphical region of interest (ROI) indicator through simple "handle dragging" operations using a mouse, in order to define the location parameters of a subset of an image that is to be analyzed by the image procession operations of a particular instance of a video tool. It should be noted that the visible user interface features are sometimes referred to as the video tool, with the underlying operations being included implicitly.

In common with many video tools, the edge location and parameter setting subject matter of this disclosure includes both user interface features and underlying image processing operations, and the like, and the related features may be characterized as features of a multiple edge feature video tool (or multi-edge video tool) 143$ef$ with a corresponding parameter setting portion 143$ps$. The multiple edge feature video tool 143$ef$ generally includes an algorithm for determining edge locations. The algorithm may be governed by edge detection parameters that may be determined and programmed automatically in some cases during learn mode, and/or manually adjusted by a user (e.g., a threshold such as THS described in greater detail below). The parameter setting portion 143$ps$ may include a gradient threshold portion 143$gt$ and a gradient prominence counter 143$gpc$ that implement various operations according to principles described in greater detail below.

The video tool portion 143 may also, or instead, include a conventional edge feature video tool that operates according to known edge detection or location methods. In one embodiment, the multiple edge feature video tool 143$ef$ may be linked or otherwise act in conjunction with such a tool. For example, in one embodiment, the edge gradient threshold and/or prominence-counting operations disclosed herein may be included as a multi-edge mode in a multi-mode edge feature tool that includes modes comparable to the known edge tools (e.g., a known box tool, arc tool, circle tool, etc.); that is, there may be two modes of operation in a single edge tool. In other embodiments, the multiple edge feature video tool 143$ef$ and the known or conventional edge tool(s) may be separate tools. In some embodiments where they are two modes of a single edge tool, the particular mode may be chosen by the edge tool based on manual operations (e.g., by selecting the "Multi-Edge Box Tool—Advanced Parameters" tab of the box tool user interface and/or selected the multi-edge option in the multi-edge mode parameter/editing box, as described with reference to FIGS. 3 and 4, below), or based on automatic operations (e.g., based on an automatic analysis of how many similar edges are included in a ROI).

In one implementation, in order that a user may verify and/or manually set or adjust edge feature video tool parameters, the parameter setting portion 143$ps$ may include various user interface features that indicate and/or adjust various video tool parameters and/or their related effects. One or more edge feature representation windows (e.g., showing a scan line intensity and/or a scan line intensity gradient and/or a field of view of the machine vision system) are provided that illustrate changes to the parameters and/or the edge features that are detectable according to the current parameter configuration, as will be described in more detail below with respect to FIGS. 3, 4, 5 and 6.

The signal lines or buses 221, 231, and 241 of the stage light 220, the coaxial lights 230 and 230', and the surface light 240, respectively, are all connected to the input/output interface 130. The signal line 262 from the camera system 260 and the signal line 296 from the controllable motor 294 are connected to the input/output interface 130. In addition to carrying image data, the signal line 262 may carry a signal from the controller 125 that initiates image acquisition.

One or more display devices 136 (e.g., the display 16 of FIG. 1) and one or more input devices 138 (e.g., the joystick 22, keyboard 24, and mouse 26 of FIG. 1) can also be connected to the input/output interface 130. The display devices 136 and input devices 138 can be used to display a user interface, which may include various graphical user interface (GUI) features that are usable to perform inspection operations, and/or to create and/or modify part programs, to view the images captured by the camera system 260, and/or to directly control the vision system components portion 200. The display devices 136 may display user interface features associated with the edge feature video tool 143$ef$ and parameter setting portion 143$ps$, described in greater detail below.

In various exemplary embodiments, when a user utilizes the machine vision inspection system 100 to create a part program for the workpiece 20, the user generates part program instructions by operating the machine vision inspection system 100 in a learn mode to provide a desired image acquisition training sequence. For example, a training sequence may comprise positioning a particular workpiece feature of a representative workpiece in the field of view (FOV), setting light levels, focusing or auto focusing, acquiring an image, and providing an inspection training sequence applied to the image (e.g., using an instance of one of the video tools on that workpiece feature). The learn mode operates such that the sequence(s) are captured or recorded and converted to corresponding part program instructions. These instructions, when the part program is executed, will cause the machine vision inspection system to reproduce the trained image acquisition and inspection operations to automatically inspect that particular workpiece feature (that is the corresponding feature in the corresponding location) on a run mode workpiece or workpieces that matches the representative workpiece used when creating the part program.

Figure 3:
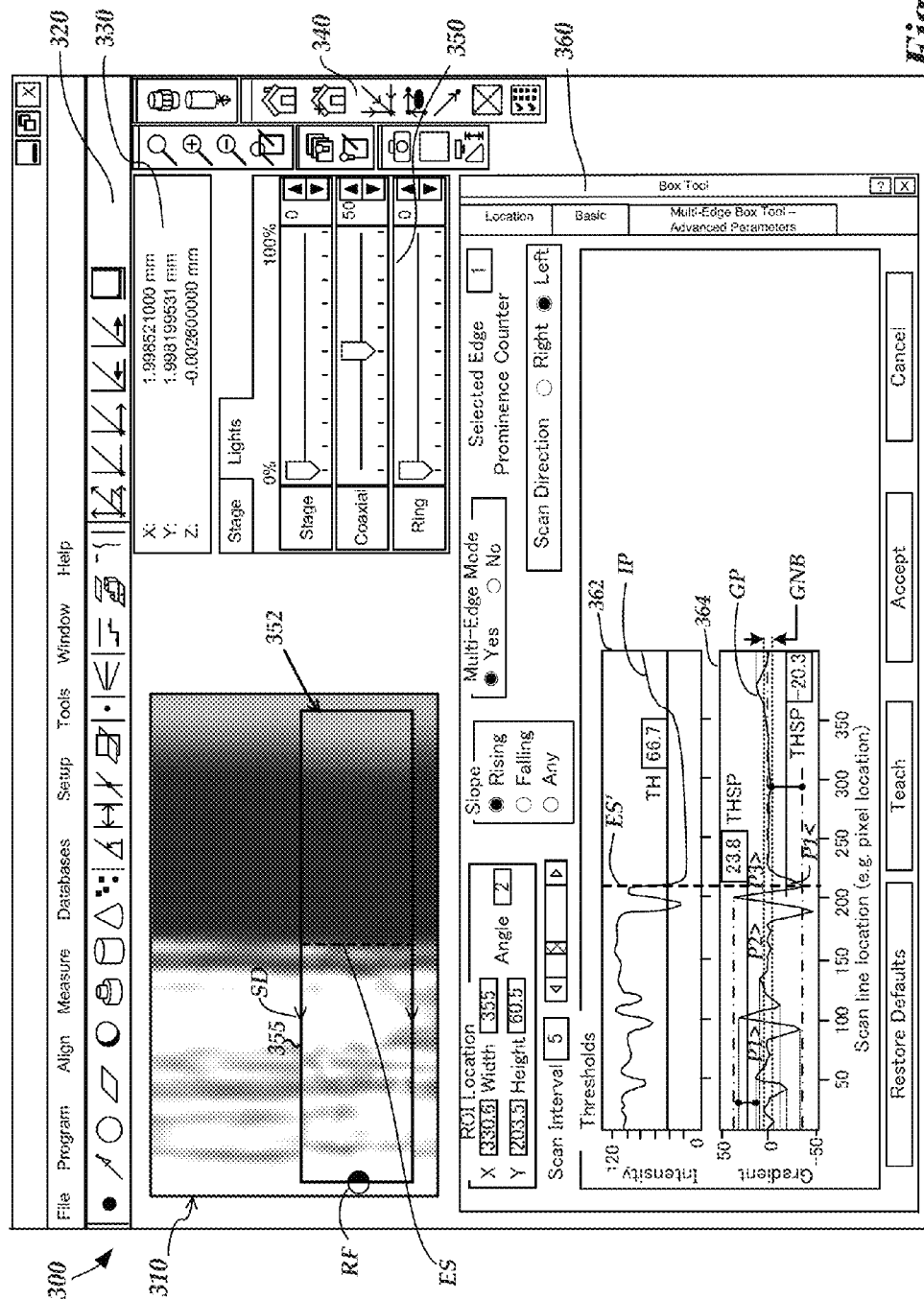
FIGS. 3 and 4 are diagrams illustrating similar embodiments of a user interface display that includes various elements related to principles and features disclosed herein for locating a particular edge among multiple edges.
Figure 4:
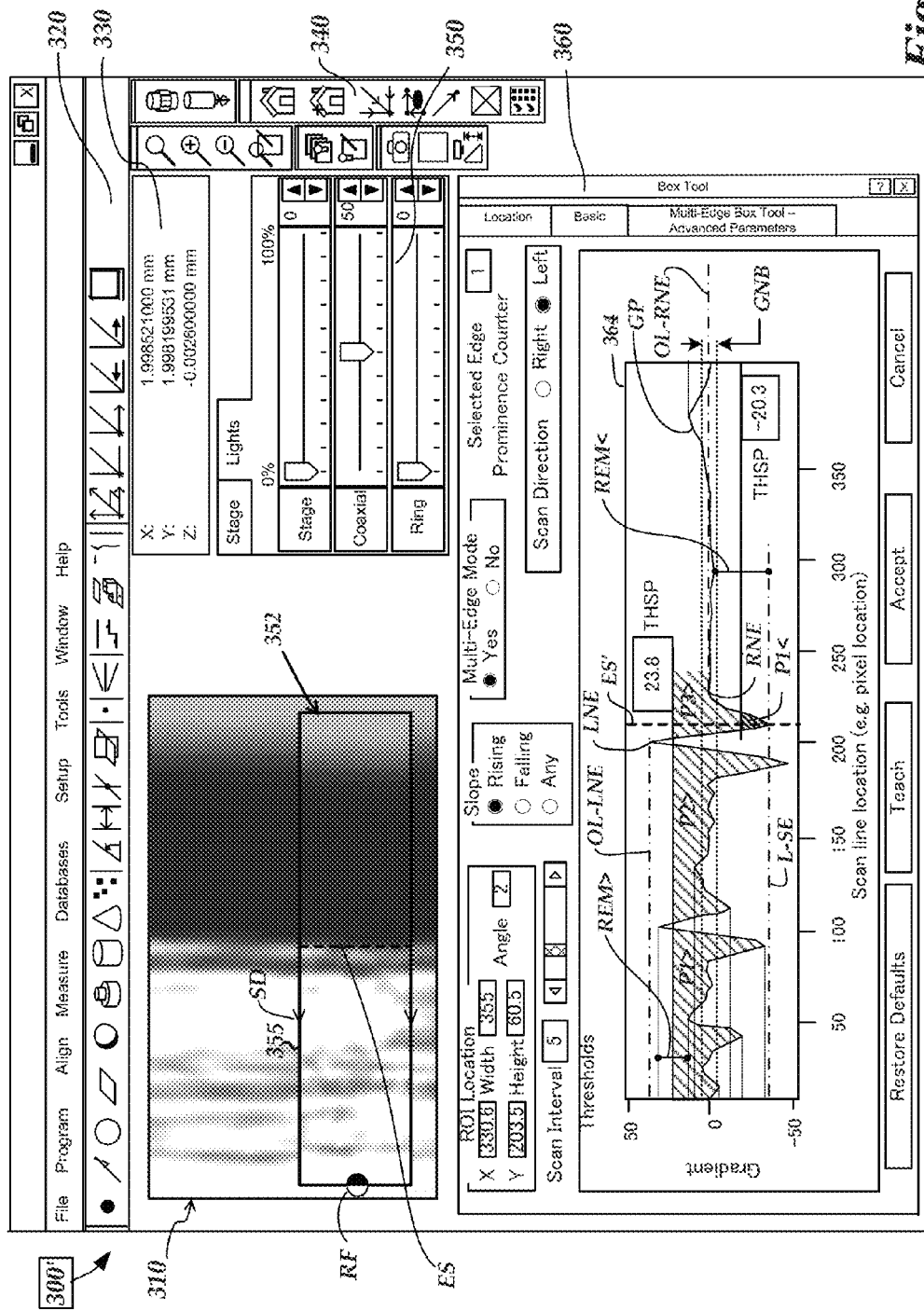

FIGS. 3 and 4 are diagrams illustrating similar embodiments of a user interface display 300 (300') that includes various elements related to principles and features disclosed herein for locating a particular edge among multiple edges. FIGS. 3 and 4 include a field of view window 310 including a workpiece image, various measurement and/or operation selection bars such as the selection bars 320 and 340, a real-time X-Y-Z (position) coordinate window 330, a light control window 350, and an edge detection video tool user interface (a "box tool" user interface) that includes the edge detection parameter window 360, which in the embodiment shown in FIGS. 3 and 4 is displayed by selecting the "Multi-Edge Box Tool—Advanced Parameters" tab of the box tool user interface. The box tool user interface also includes the box tool GUI widget 352 superimposed on the image in the field of view window 310, including a region of interest indicator 355, a rising/falling indicator RF, scan direction arrowheads SD, and an edge selector ES (shown by a dashed line, in this particular embodiment), which are elements known in commercially available systems. The rising/falling indicator RF, in combination with the scan direction arrowheads SD, define whether detected edges have rising or falling intensity along the scan direction. The edge selector ES indicates the edge that is to be detected (e.g., by the current set of tool parameters). The edge detection parameter window 360 may also include a multi-edge mode parameter/editing box (which may be used to enable or disable the multi-edge mode operations disclosed herein, with the alternative being a mode that uses conventional edge detection operations), a ROI location parameter/editing box, a scan direction parameter/editing box, a rising/falling edge slope parameter/editing box, a selected edge prominence counter parameter/editing box, and a scan interval parameter/editing box. It will be appreciated that various parameters may have default values and/or values determined automatically based on previous user interface operations or the like. The principles of the user interface 300 (300'), and/or additional features that may be combined with the principles and features described herein, may be further understood with reference to the disclosure of commonly assigned U.S. patent application Ser. No. 11/669,333 (the '333 application), which is hereby incorporated by reference in its entirety. It is noteworthy that despite differences in the multi-edge feature tool operations and parameter usage described herein in comparison to the operations and parameter usage of conventional edge feature tools, in various embodiments the GUI widget 352, or the like, may appear substantially similar or identical for both multi-edge feature tool operations and conventional edge feature tool operations. This is desirable from the standpoint of user training and ease of use.

The edge detection parameter window 360 may include a scan line intensity profile window 362 (shown only in FIG. 3) and scan line intensity gradient profile window 364, as well as representations or indicators of current edge detection parameters, described further below. The scan line intensity profile window 362 and scan line intensity gradient profile window 364 illustrate graphs of a scan line intensity profile IP and a scan line intensity gradient profile GP (the slope of the scan line intensity profile IP) at pixel locations along the scan line direction for a representative scan line (e.g., a central or average scan line, or the like) across the region of interest transverse to the selected edge of the edge feature video tool 352. In the scan line intensity profile window 362, shown in FIG. 3, edge features are understood to be represented by significant changes in intensity over a relatively limited distance along the scan line. Such significant changes in intensity are reflected by corresponding significant extrema (that is, gradient peaks or valleys) in the intensity gradient profile GP in the scan line intensity gradient profile window 364.

In order to better understand the novel features of the multi-edge operations disclosed herein, some operations of a known edge detection tool will first be outlined. Known edge detection operations and/or video tools are generally applied to locate relatively distinctive, isolated, edges. Generally, such an edge exhibits significant contrast across the edge, which corresponds to a significant intensity change across the edge in the scan line intensity profile IP, and the edge is typically relatively localized or "sharp," which corresponds to a significant gradient peak or valley in a scan line intensity gradient profile GP. Thus, such an edge is conventionally discriminated by an intensity threshold parameter (which may have the important function of triggering an error notification if the intensity change across the edge is not as expected, due to a lighting failure or part defect, or the like), and an intensity gradient threshold parameter. The parameter TH shown in FIG. 3 defines a threshold that is related to a minimum level of brightness or intensity change required across an edge.

In another case, a parameter that requires a minimum level of intensity rate of change across an edge (e.g., a gradient value, which may characterize a width or sharpness of an edge) may further characterize a particular instance of an edge, and may prevent an edge detection video tool from returning an edge location in the case of an unexpected change in the form of an edge, or its illumination (e.g., an ambient illumination change, or direction change), or the focus of its image (a blurry image broadens and softens an edge) relative to the "learn mode" edge formation or illumination that was used for the initial training/programming of the video tool. In the incorporated '333 application, the related gradient threshold parameter is designated THS. (An analogous gradient value threshold THSP is shown in FIG. 3, but it is used in a different way, for defining gradient prominences, as described further below). For purposes of explanation only, an intensity threshold parameter is indicated in the window 362 in FIG. 3 by the horizontal line labeled "TH 66.7." An intensity gradient threshold parameter is indicated in the window 364 by the horizontal line labeled "THSP −20.3." A second intensity gradient threshold parameter is also indicated in the window 364 by the horizontal line labeled "THSP 23.8." The purpose of this second intensity gradient threshold is explained further below.

It will be appreciated that in prior art methods of edge feature location, and related video tools, the combination of parameters TH and THS outlined above are typical of those parameters that are set to correspond to and/or characterize a "prototype" instance of an edge during learn mode, and the same parameters have then been used to detect a corresponding edge during run mode. The parameters may also cause the "failure" of the video tool when the expected conditions are not fulfilled (or nearly fulfilled), which is a failsafe feature of the method. Such a method is effective in cases where a single or strong edge may be reliably isolated in a ROI.

In the embodiment shown in FIG. 3, the windows 362 and 364 relatively realistically represent the intensity characteristics observed for an average of all scan lines transverse to the selected edge ES for the ROI and selected edge ES represented in the field of view window 310. The selected edge ES is marked by a dashed line selected edge indicator ES' in the windows 362 and 364 for clarification of the relationship between the various windows. In various embodiments, the selected edge indicator ES' may or may not actually be shown in the video tool user interface. It may be seen in FIG. 3 that the selected edge ES is not unique in having intensity and gradient values that satisfy the indicated thresholds TH and THSP, which illustrates one problem with prior art edge detection methods when a plurality of edges are included in the ROI. For example, the next edge to the left of the selected edge ES in FIG. 3 has very similar characteristics (e.g., a similarly low intensity value and negative gradient value). In some prior art methods, it has been attempted to discriminate between multiple edges by applying conventional parameters (e.g., TH and THS) and/or known methods to identify a number of similar edges, and then "count the edges" from the right or left side of the scan, to isolate the selected edge. However, this further complicates and/or narrows the selection of the conventional threshold parameters, and the resulting edge detection parameters often lead to detection operations that are susceptible to errors arising from minor variations in the characteristics of one or more of the multiple edges that must be counted. In various embodiments disclosed herein, because multiple similar edges may be present in the ROI, the intensity threshold value TH shown in the window 362 may not be useful for discrimination of the selected edge ES, and may be ignored or omitted in multi-edge tool operations. For this and other reasons, it will be understood that the information in the windows 362 and 364 are interrelated and somewhat redundant, and the window 362 may be omitted in various embodiments (e.g., as shown in FIG. 4.)

For the reasons outlined above, prior art methods of edge location are not broadly applicable or reliable for discriminating between multiple and/or similar edges in a ROI. As a further example, in the window 310 it may be observed that several of the "edges" in the ROI may be better characterized as texture variations, or the like. They have characteristics somewhat similar to the selected edge ES, but their placement and number may actually be somewhat variable depending on random variations in the finishing operations applied to a particular workpiece.

Regarding the novel features of the multi-edge operations disclosed herein, in contrast to prior art methods, in one sense the methods disclosed herein may be qualitatively thought of as relying on an overall pattern of edge characteristics or textures in a ROI in order to "point to" or isolate the selected edge in a ROI, as opposed to relying on detecting individual edges. This may be a more reliable and robust approach than exclusively detecting individual edges, particularly when a number of similar edges are close to one another, or an unpredictable number of similar edges occur in a region of a workpiece (e.g., "edges" that arise from surface finish, or the like). Briefly stated, a relatively simple and reliable method described below includes defining and counting "gradient prominences" that may include multiple edge-like features (the precise number is not critical), as opposed to identifying individual gradient peaks related to corresponding individual edges. The gradient prominences are defined or delimited by a threshold that is set according to principles that are likely to result in stable gradient prominences, in contrast to setting a threshold that is based predominantly on the characteristics of the selected edge. The gradient prominences then act like stable landmarks that point the way to the selected edge in the overall pattern of edge characteristics in a ROI, based on an associated prominence-counting parameter.

FIG. 4 shows one embodiment of the user interface 300' wherein features of the multi-edge operations and/or modes disclosed herein are emphasized. In the user interface 300', the intensity profile window 362 shown in FIG. 3 is omitted, and the intensity gradient profile window 364 is emphasized and enhanced by some related features, as described in greater detail below.

It will be understood that the user interface 300' reflects a "current instance" of an edge feature video tool that includes multi-edge operations, as described in greater detail below. The current instance of the edge feature video tool may be implemented by known methods, for example, including displaying a video tool toolbar (not shown) by using the "tools" menu shown in the user interface 300', selecting the appropriate video tool icon on the toolbar, and then clicking in the window 310 (or dragging the icon into the window 310, or the like) to create the current instance of the editable/adjustable box tool GUI widget 352. In some embodiments, this action may also open the parameter window 360. As shown in FIG. 4, the GUI widget 352 has been adjusted to define a ROI including a plurality of edge-like features on the workpiece, and the edge selector ES has been positioned to define the selected edge feature within the ROI that is to be detected by the edge detection operations of the multi-edge mode of the video tool.

In some embodiments, once the ROI is defined, the corresponding intensity gradient profile GP may be displayed in the intensity gradient profile window 364. As indicated previously, the gradient profile GP may be computed by known methods based on pixel intensity values along a representative "scan line" across the ROI including the selected edge. In various embodiments, the representative scan line may be a central or selected scan line corresponding to a single row of image pixels, or a filtered scan line, or alternatively an average scan line based on several rows of pixels, or the like. The gradient profile GP will generally exhibit a number of extrema—also referred to as local maxima and minima, or peaks and valleys—corresponding to edges or edge-like features. Herein, regardless of their magnitudes, peaks and valleys are referred to as having opposite polarities if they point in opposite directions. In various embodiments, for reasons described in greater detail below with reference to FIG. 5, multi-edge operations performed by a video tool may include identifying significant local maxima and minima along the gradient profile GP. For example, such operations may be performed by gradient profile analysis portion 143$gpa$, previously outlined with reference to FIG. 2.

In FIG. 4, the peaks (valleys) of some of these extrema are marked with light horizontal dashed lines, for purposes of reference. FIG. 4 also shows a gradient noise band GNB, surrounding the gradient value zero. In some embodiments, local maxima and minima having values within the gradient noise band GNB are considered insignificant (e.g., as insignificant edges or texture features) and are ignored. In some embodiments, multi-edge operations of the video tool may automatically prevent an edge gradient threshold parameter from being set to a value within the gradient noise band. In some embodiments, the GNB limits may be set at predetermined values based on experience. In some embodiments, the GNB limits may be automatically set based on a noise analysis of the gradient profile GP, and/or adjusted manually by a user (e.g., by clicking on and dragging limit lines of the gradient noise band GNB in the user interface, or entering a desired numerical value, or the like).

In some embodiments, once the selected edge feature is defined, various multi-edge mode operations may be performed and related features may be determined and/or displayed, as described in greater detail below. FIG. 4 shows various related elements. An edge gradient threshold THSP (e.g., one of the two edge gradient thresholds THSP) is used to define gradient prominences (e.g., the prominences P1>, P2>, etc.). The edge gradient threshold THSP is set within a maximum range having a gradient profile extremum value of the selected edge as one limit L-SE and an opposing limit (e.g., one of the two opposing limits OL-LNE and OL-RNE) that is not farther from the selected edge extremum value than the value of a neighbor extremum that is adjacent to the selected edge extremum along the intensity gradient profile GP, and that has a polarity opposite to the extremum of the selected edge ES (e.g., one of the left neighboring extrema LNE and the right neighboring extrema RNE). In FIG. 4, two "candidate" edge gradient thresholds THSP are shown, for reasons described further below. The threshold THSP having the value 23.8 is set within a maximum range having an opposing limit OL-LNE based on the left neighboring extrema LNE. The threshold THSP having the value −20.3 is set within a maximum range having an opposing limit OL-RNE based on the right neighboring extrema RNE. When the edge gradient threshold THSP is set within a maximum range defined in this manner, it may generally be found that the selected edge extremum is thereby one of the first or last extremum encountered along the determined profile scan direction in its associated gradient prominence, which may simplify the processing related to reliably identifying the selected edge location, in some embodiments.

Prominences, in the field of geography, are topographic features that may include a central peak as well as surrounding sub-peaks that exceed a certain elevation. The term "gradient prominence" suggests analogous characteristics. In particular, as the term is used herein, gradient prominences are defined by limits along the intensity gradient profile GP at intersections between a determined edge gradient threshold THSP and the intensity gradient profile. For the purposes of locating the selected edge, in some embodiments, only the intersections and/or prominences that are encountered before the selected edge along the determined profile scan direction need be considered. It will be appreciated that a single gradient prominence, defined by one or more limits at intersections as indicated above, may include a plurality of gradient extrema corresponding to a plurality of respective edges along the intensity gradient profile GP. In some embodiments, it is sufficient if prominences are considered to correspond to the portions of the gradient profile GP that extend to the same side of the edge gradient threshold THSP as the extremum corresponding to the selected edge. However, in other embodiments, prominences of either polarity may be considered, with appropriate adjustments to the methods and embodiments described herein.

Some gradient prominences are marked with crosshatching and labeled in FIG. 4, for purposes of clarification. In this example, each labeled prominence extends to the same side of the edge gradient threshold THSP as the extremum corresponding to the selected edge. For example, the candidate threshold THSP=23.8 (associated with the left neighboring extrema LNE and a scan direction from left to right), intersects the gradient profile GP to define a first prominence P1> (where the symbol ">" points along the scan direction from left to right) between the scan direction starting point and the first intersection. The gradient prominence P2> is defined between the second and third intersections proceeding from left to right along the scan line gradient profile, and the gradient prominence P3> is defined to begin at the fourth intersection. It will be seen that the selected edge ES' is the first extremum encountered by proceeding along the scan direction in the gradient prominence P3>, which allows the selected edge to be located without consideration of the right end limit of the gradient prominence P3>. As another further example, the candidate threshold THSP=−20.3 (associated with the right neighboring extrema RNE and a scan direction from right to left) intersects the gradient profile GP to define a first prominence P1< (where the symbol "<" points along the scan direction from right to left) between the first and second intersections proceeding from right to left along the scan line gradient profile. It will be seen that the selected edge ES' is the first extremum encountered in the gradient prominence P1< (and it is also the only extremum encountered in the gradient prominence P1<, in this particular case).

It will be appreciated that the approximate location of the selected edge ES' along the gradient profile GP is known based on the user positioning the edge selector ES. Therefore, it is possible to automatically determine that prominence includes the selected edge. Furthermore, as outlined above for the embodiment described here, the selected edge may be identified more specifically as the first significant extremum encountered in that prominence when proceeding along the associated scan direction. The principles and methods outlined above may be implemented using known programming methods and/or signal processing circuits. For example, such operations may be performed by the gradient profile analysis portion 143*gpa* and/or the gradient prominence counter portion 143*gpc*, previously outlined with reference to FIG. 2.

In the example shown in FIG. 4, the candidate threshold THSP=−20.3 has been selected as the edge gradient threshold to be used for locating the selected edge ES/ES'. As previously noted, the edge gradient threshold THSP=−20.3 is associated with a maximum range based on the right neighbor extremum RNE. In the embodiment shown in FIG. 4, the scan direction is selected to be from right to left as indicated by the scan direction parameter/editing box (that is, the scan direction proceeds toward the left). In the particular embodiment shown in FIG. 4, the edge gradient threshold THSP=−20.3 is set at the midpoint of a robust extremum margin REM< that is associated with that scan direction and/or that maximum range. Robust extremum margins are described in greater detail below with reference to FIG. 5.

The right neighbor extremum RNE is encountered in the gradient profile before the selected edge along the scan direction, which it may be seen relates to an adjacent intersection that defines a gradient prominence limit, and the selected edge is thereby the first significant extremum encountered in its corresponding prominence P1< when proceeding along the scan direction. Since the gradient prominence associated with the selected edge ES/ES' is the first gradient prominence P1< along the scan direction (which may be automatically determined, as outlined above), the Selected Edge Prominence Counter parameter/editing box may be automatically set to "1." This particular type of prominence-counting parameter is exemplary only, and not limiting. For example, it will be appreciated that the gradient prominence-counting parameter may instead count intersections, or prominences of both polarities, or the like. More generally, it will be understood, based on the foregoing description, that the gradient prominence-counting parameter is sufficient if the gradient prominence-counting parameter is indicative of the location of the selected edge in relation to the defined gradient prominences, in which case related signal processing may be used to reliably and robustly locate the selected edge according to the principles outlined above. Identifying the number of the gradient prominence that includes the selected edge is just one such possibility.

In the foregoing description, the candidate threshold THSP=−20.3 was selected as the edge gradient threshold to be used for locating the selected edge ES/ES'. However, it should be appreciated that the candidate threshold THSP=23.8 could be used in alternative example. In such a case, the edge gradient threshold THSP=23.8 may be advantageously associated with a maximum range based on the left neighbor extremum LNE. The scan direction may be selected to be from left to right (e.g., by the selecting the "Right" radio button in the scan direction parameter/editing box). In one embodiment, the edge gradient threshold THSP=23.8 may be set at the midpoint of the robust extremum margin REM>, which is associated with the scan direction toward the right and/or maximum range associated with the left neighbor extremum LNE. The left neighbor extremum LNE is encountered in the gradient profile before the selected edge along the scan direction that proceeds to the right, which, it may be seen, relates to an adjacent intersection that defines a gradient prominence limit, and the selected edge is thereby the first significant extremum encountered in its corresponding prominence P3> when proceeding along that scan direction. Since the gradient prominence associated with the selected edge ES/ES' is the third gradient prominence P3> along the scan direction (which may be automatically determined, as outlined above), the Selected Edge Prominence Counter parameter/editing box may be automatically set to "3" (not shown).

In some embodiments, robust extremum margins REM> and REM< may be determined corresponding to each of the two scan directions (e.g., as displayed in FIG. 4), and one of the two robust extremum margins may be selected. In some embodiments, the selection may be done manually (e.g., by selecting an associated robust extremum margin indicator or a parameter editing box, or the like), and the edge gradient threshold may be set within the selected margin. The scan direction may also be set to correspond to the selected robust extremum margin. Alternatively, in some embodiments, selecting the scan direction (e.g., by manually selecting the scan direction radio button) may automatically select the corresponding robust extremum margin.

It will be appreciated that the combination of elements shown in the user interface examples in FIGS. 3 and 4 are exemplary only and not limiting. Various elements may be added or eliminated in various embodiments and/or during different phases of the operations outlined herein, if desired, and/or the various elements may be presented in different forms that fulfill a similar function. For example, in some embodiments, maximum ranges may be automatically determined and/or selected, and/or robust extremum margins may be automatically determined and/or selected, and the edge gradient threshold may be automatically set within the determined or selected maximum range or robust extremum margins. In such a case, any desired GUI element related to the foregoing may be displayed for convenience (e.g., by displaying a corresponding indicator such as limit lines, or a shaded band, or the like), or omitted for simplification, in various embodiments.

In some embodiments, the relevant gradient prominences resulting from a current set of parameters may be displayed, if desired. Alternatively, in various embodiments, any desired GUI element related to the foregoing may be displayed for recognition and/or confirmation and/or adjustment by a user. For example, a gradient threshold indicator corresponding to a current value of the edge gradient threshold may be displayed by overlaying a displayed gradient profile in the video tool GUI (e.g., as shown in FIG. 4) and the threshold indicator (and the underlying parameter) may be manually adjustable (e.g., by selection and dragging the threshold indicator in the GUI). In some embodiments, the relevant gradient prominences resulting from a current set of parameters may be displayed, and updated in real time corresponding to the manual adjustment of a parameter indicator, if desired.

While the exemplary embodiments shown in FIGS. 3 and 4 illustrate the use of a box type tool, it should be appreciated that the same operations may be applied to an arc tool, or a circle tool, or the like, where a scan line profile transverse to a selected edge may follow a radial direction.

Figure 5:
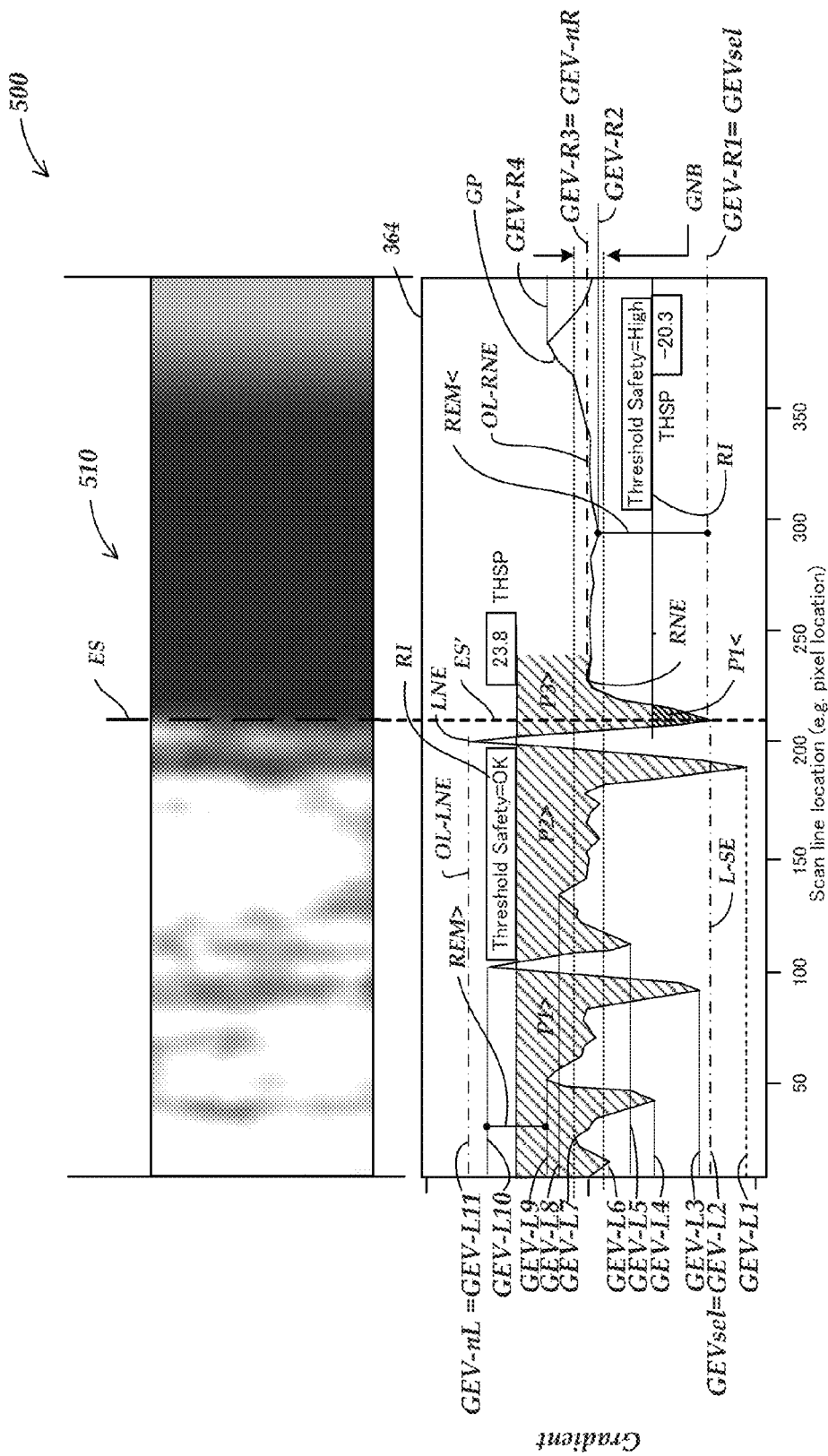
FIG. 5 is a diagram illustrating various considerations related to locating a particular edge among multiple edges, and particularly related to a method for setting a gradient threshold in a robust extremum margin such that edge location results are relatively insensitive to reasonably expected variations between workpieces.

FIG. 5 is a diagram 500 illustrating various considerations related to locating a particular edge among multiple edges, and particularly related to a method for setting a gradient threshold in a robust extremum margin such that edge location results are relatively insensitive to reasonably expected variations between workpieces. The elements in FIG. 5 are approximately similar to their counterparts shown in the user interfaces in FIGS. 3 and 4, and may generally be understood by analogy. For example, 5XX series numbers in FIG. 5 that have the same "XX" suffix as 3XX and 4XX series numbers in FIGS. 3 and 4 may designate similar or identical elements, except as otherwise described or implied below.

FIG. 5 shows the scan line gradient profile GP. Local maxima and minima (e.g., as identified automatically by known mathematical methods implemented in appropriate analysis routines) have gradient extrema values GEV that are marked in FIG. 5. In particular, a first set of gradient extrema values that are located to the left of (and including) the selected edge ES' are marked as gradient extrema values GEV-L1 through GEV-L11. The "-LXX" suffix indicates that these gradient extrema values are located on the left of the selected edge ES/ES'. It will be understood that these extrema are encountered along a "Right" scan direction that proceeds from the left end and toward the right along the gradient profile GP, up to and including the selected edge ES/ES'. These extrema are relevant to determining a first scan direction robust extremum margin that is a "Right" scan direction robust extremum margin.

It should be appreciated that the gradient threshold level is used to define gradient prominences, which are the landmarks used to locate the selected edge in various embodiments disclosed herein. Thus, it is advantageous to set the gradient threshold at a level that is relatively far from any extremum value exhibited in the gradient profile GP. This will define the gradient prominences in a stable and repeatable manner, despite potential variations in particular gradient extremum values between workpieces and/or workpiece images. It may be seen that one way to accomplish this is to set the gradient threshold in the largest gap between gradient extrema that are encountered before the selected edge along the scan direction in the gradient profile GP. Thus, we may say that a robust extremum margin satisfies defining conditions comprising:

(a) the robust extremum margin is limited by first and second gradient extremum values that would be sequential values in a ranked list of gradient extremum values corresponding to gradient extrema in the intensity gradient profile that are included in the maximum range and that are encountered before and including the selected edge along the determined profile scan direction; and (b) the first and second gradient extremum values that limit the robust extremum margin are sequential values that exhibit one of (b1) the largest difference between sequential values in the ranked list, and (b2) a difference that exceeds a minimum margin value defined in the edge feature video tool.

In FIG. 5, the gradient extremum values GEV-L1 through GEV-L11 are shown as a ranked list, in that the values are ranked or ordered sequentially by value along the vertical axis. By inspection, we see that GEV-L1 falls outside the maximum range related to the robust extremum margin REM>, which, in this particular example, is related to the left neighbor extremum LNE. That is, in this particular example, the maximum range related to the robust extremum margin REM> is limited between L-SE=GEVsel=GEV-L2 and OL-LNE=GEV-nL=GEV-L11. Therefore, GEV-L1 is outside the relevant maximum range, and is eliminated from consideration. Two of the larger differences between sequential values in the remaining ranked list are between GEV-L3 and GEV-L4, and between GEV-L9 and GEV-L10, for example. The difference between GEV-L9 and GEV-L10 is the largest difference between sequential values in the remaining ranked list. Therefore, in this particular embodiment, these are the two gradient extremum values that limit the "Right" scan direction robust extremum margin, as shown by the indicator REM>. The gradient threshold THSP=23.8 may be automatically set in the middle of the "Right" scan direction robust extremum margin REM>, in this example. However, a user may choose to locate the gradient threshold somewhere else within a scan direction robust extremum margin, in some embodiments.

It may be seen by inspection of FIG. 5 that a gradient threshold THSP anywhere inside the robust extremum margin REM> (excluding its limits) will result in the selected edge occurring in prominence P3> when proceeding along the "Right" scan direction. The Selected Edge Prominence Counter parameter/editing box may be automatically set to a corresponding value (e.g., "3"), according to previously outlined principles. Thus, the parameter set outlined above may be considered to robustly indicate the selected edge, despite reasonable variations in particular extrema value between workpieces and/or images, and despite the plurality of similar edges that are included in the video tool ROI.

In FIG. 5, a second set of gradient extrema values are located to the right of (and including) the selected edge ES', and are marked as gradient extrema values GEV-R1 through GEV-R4. The "-RXX" suffix indicates that these gradient extrema values are located on the right of the selected edge ES/ES'. It will be understood that these extrema are encountered along a "Left" scan direction that proceeds from the right end and toward the left along the gradient profile GP, up to and including the selected edge ES/ES'. These extrema are relevant to determining a second scan direction robust extremum margin that is a "Left" scan direction robust extremum margin. The gradient extremum values GEV-R1 through GEV-R4 are shown as a ranked list, in that the values are ranked or ordered sequentially by value along the vertical axis.

By inspection, we see that GEV-R4 falls outside the maximum range related to the robust extremum margin REM<, which in this particular example is related to the right neighbor extremum RNE. That is, in this particular example, the maximum range related to the robust extremum margin REM< is limited between L-SE=GEVsel=GEV-R1 and OL-RNE=GEV-nR=GEV-R3. Therefore, GEV-R4 is outside the relevant maximum range and is eliminated from consideration. The largest difference between sequential values in the remaining ranked list is between GEV-R1 and GEV-R2. Therefore, in this particular embodiment, these are the two gradient extremum values that limit the "Left" scan direction robust extremum margin, as shown by the indicator REM<. The gradient threshold THSP=−20.3 may be automatically set in the middle of the "Left" scan direction robust extremum margin, REM<, in this example.

It may be seen by inspection of FIG. 5 that a gradient threshold THSP anywhere inside the robust extremum margin REM< (excluding its limits) will result in the selected edge occurring in prominence P1< when proceeding along the "Left" scan direction. The Selected Edge Prominence Counter parameter/editing box may be automatically set to a corresponding value (e.g., "1"), according to previously outlined principles. Thus, the parameter set outlined above may be considered to robustly indicate the selected edge, despite reasonable variations in particular extrema values between workpieces and/or images, and despite the plurality of similar edges that are included in the video tool ROI.

In the particular example described immediately above, the Left scan direction robust extremum margin REM< is quite large, and the threshold is set in the middle. In some embodiments or applications, this renders the gradient noise band unnecessary, and it may be ignored or omitted. Thus, Left scan direction robust extremum margin REM< may extend to GEV-R2, which may be in a gradient noise band in some embodiments. However, in some embodiments, it is simply safer to assume that the form of the gradient profile GP is unpredictable, and extremum values in the gradient noise band correspond to relatively weak edges and/or textures, and may be highly variable and/or unreliable between workpieces and/or images. Therefore, in some embodiments, an edge feature video tool includes operations that automatically prevent the edge gradient threshold from being set to a value within the gradient noise band, which includes the gradient value zero.

In some embodiments, the gradient noise band may be set to exclude the 25% of the gradient extremum values GEV that have the smallest absolute value, or the like, for a particular gradient profile. In other embodiments, it may be set at predetermined limits known to correspond to weak or unreliable edges, based on analysis or experiment.

In some embodiments, when a neighbor extremum falls within the gradient noise band, then the opposing limit of the maximum range corresponding to that neighbor extremum may be defined to be not farther from the selected edge extremum value than a limit of the gradient noise band that is closest to the selected edge extremum value. This limits the maximum range to such that it excludes a "noisy" neighbor extremum, thereby also automatically excluding any noisy robust extremum margin limits in the gradient noise band, and automatically ensuring that the gradient threshold limit is not set in the gradient noise band.

Each of the Right and Left robust extremum margins described above are based on the two sequential gradient extremum values that exhibit the largest difference between sequential values in their ranked list. However, this embodiment is exemplary only, and not limiting. In other embodiments, multiple edge operations may include a minimum margin value or difference requirement that has been determined to provide stable results for reasonably expected workpiece and/or image variations, and any robust extremum margin that exceeds the minimum margin value or difference requirement may be used.

Furthermore, in some embodiments, each of the Left and Right robust extremum margins may be automatically determined, and the larger one automatically and/or manually selected (e.g., the "Left" scan direction robust extremum margin REM< in FIG. 5). In some embodiments, the edge gradient threshold may be automatically set within the selected one of the Left and Right robust extremum margins. It will be appreciated that the example edges shown in FIGS. 3, 4, and 5 may suggest to the experienced user that scanning from right to left would be preferred, and that the methods outlined herein may not seem necessary for this exemplary edge. However, it will be appreciated that the method outlined above not only satisfies this common sense conclusion, but also provides an automatic or semi-automatic method that will also work where such "common sense" solutions and other prior art methods will fail (e.g., in a case where the edges and textures such as those to the left of the selected edge ES also occur to the right of the selected edge).

FIG. 5 also shows a detection robustness indicator feature that may be displayed in some embodiments of a video tool user interface. The detection robustness indicator may indicate a degree of risk associated with using the edge feature video tool to detect the selected edge feature based on a current set of the edge detection parameters. For example, the gradient threshold indicator line at 23.8 shows a detection robustness indicator "Threshold Safety=OK," indicating that the corresponding size of the Right scan direction robust extremum margin REM> reduces the risk associated with using the current set of "Right scan" parameters to detect the selected edge to reach an acceptable or "OK" level, given reasonably expected or predictable variations in the gradient profile extremum values. The gradient threshold indicator line at −20.3 shows a detection robustness indicator "Threshold Safety=High," because of the large size of the Left scan direction robust extremum margin REM<, which strongly reduces the level of risk associated with using the associated current set of "Left scan" parameters to detect the selected edge for reasonably expected or predictable variations in the gradient profile extremum values. It will be appreciated that the detection robustness indicator may comprise a color associated with the line indicating the edge gradient threshold, or the like. For example, a green threshold line may be used to indicate low risk/high safety, a yellow line may be used to indicate OK risk/OK safety, and a red line may be used to indicate high risk/low safety. Of course, any other convenient form of risk indicator may also be used.

In one embodiment, the risk indicator may be determined automatically based on the ratio of the relevant robust extremum margin (or the relevant maximum range if a robust extremum margin is not applicable in a particular embodiment or application, or the like), relative to the range on gradient values included in the gradient scan line GP (e.g., a ratio greater than 0.25 may indicate OK risk, and a ratio greater than 0.33 may indicate a low risk, in some embodiments). An alternative analysis or alternative basis for setting a risk indicator as analogous to that outlined above may be determined based on experiment or analysis.

Figure 6:
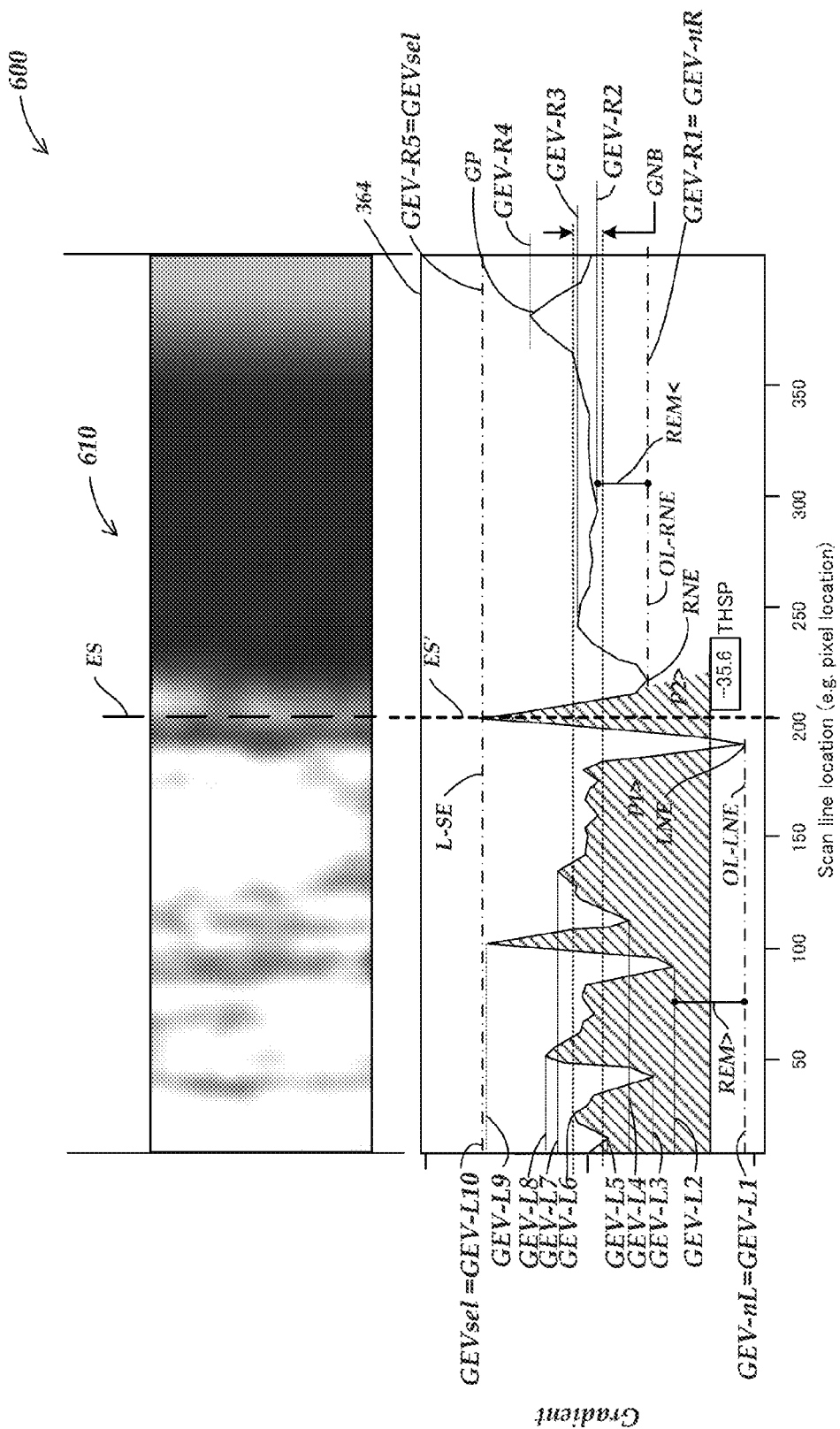
FIGS. 6 and 7 are diagrams similar to FIG. 5, illustrating various alternatives for defining a maximum range for a gradient threshold and setting the gradient threshold in alternative robust extremum margins related to the alternative maximum ranges.
Figure 7:
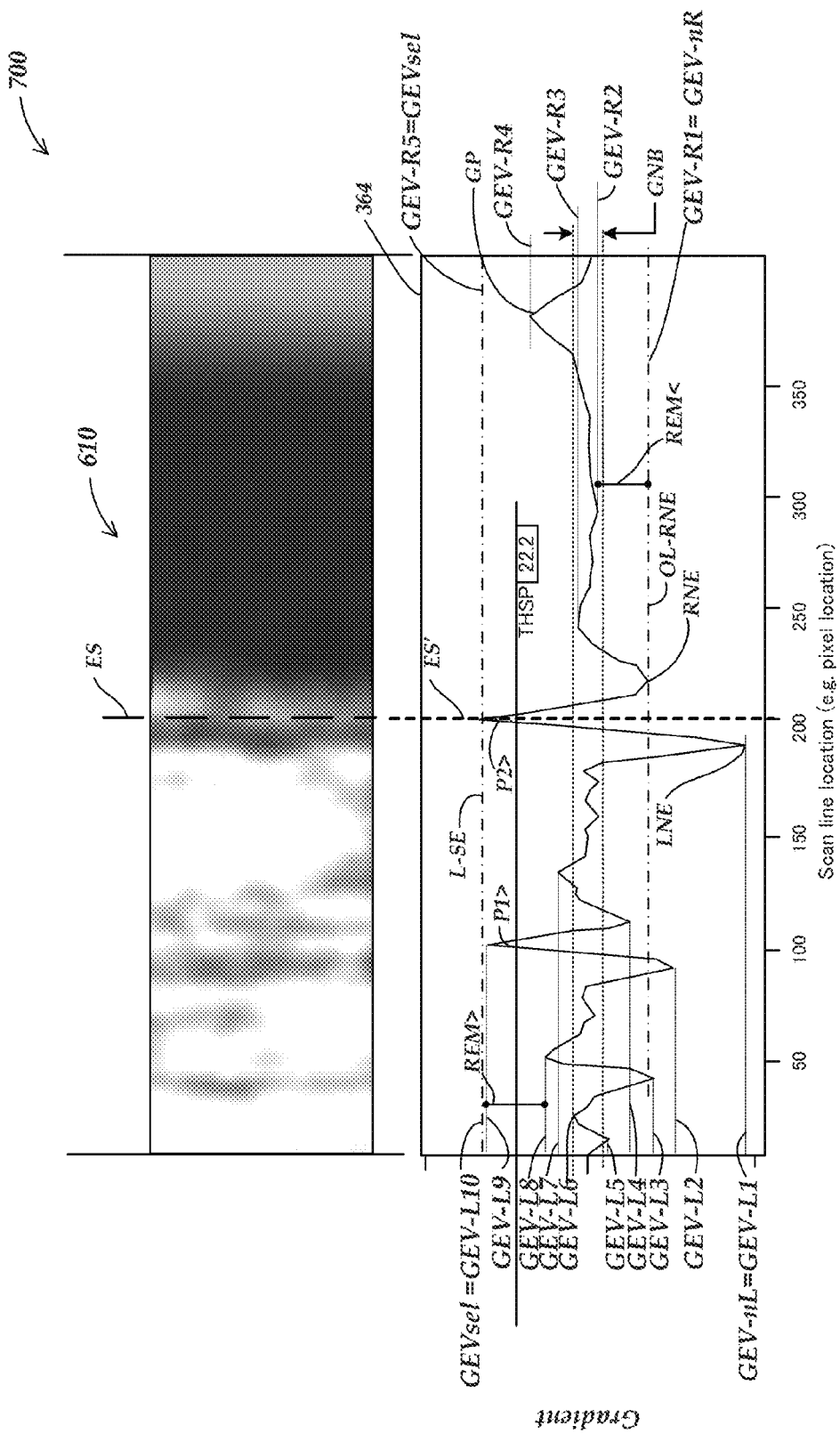

FIGS. 6 and 7 include diagrams 600 and 700, respectively, which are similar to FIG. 5, illustrating various alternatives for defining a maximum range for a gradient threshold, and setting the gradient threshold in alternative robust extremum margins related to the alternative maximum ranges. The elements in FIGS. 6 and 7 are approximately similar to their counterparts shown in FIG. 5, and may generally be understood by analogy. For example, 6XX and 7XX series numbers in FIGS. 6 and 7 that have the same "XX" suffix as 5XX series numbers in FIG. 5 may designate similar or identical elements, except as otherwise described or implied below.

As indicated previously, in some embodiments of the left and right scan direction, robust extremum margins may be determined automatically, and the larger one automatically and/or manually selected. Examples or related operations are outlined below with reference to FIGS. 6 and 7, where the selected edge ES/ES' is a different edge than that shown in FIG. 5.

In FIG. 6, a first set of gradient extrema values that are located to the left of (and including) the selected edge ES' are marked as gradient extrema values GEV-L1 through GEV-L10. The "-LXX" suffix indicates that these gradient extrema values are located on the left of the selected edge ES/ES'. It will be understood that these extrema are encountered along a "Right" scan direction that proceeds from the left end and toward the right along the gradient profile GP, up to and including the selected edge ES/ES'. These extrema are relevant to determining a first scan direction robust extremum margin that is a "Right" scan direction robust extremum margin.

For reasons outlined above, the gradient extremum values GEV-L1 through GEV-L10 are shown as a ranked list, in that the values are ranked or ordered sequentially by value along the vertical axis. By inspection, we see that all the gradient extremum values GEV-L1 through GEV-L10 fall inside the maximum range related to the robust extremum margin REM>, which in this particular example is related to the left neighbor extremum LNE. That is, in this particular example, the maximum range related to the robust extremum margin REM> is limited between L-SE=GEVsel=GEV-L10 and OL-LNE=GEV-nL=GEV-L1. The difference between GEV-L1 and GEV-L2 is the largest difference between sequential values in the remaining ranked list. Therefore, in this particular embodiment, these are the two gradient extremum values that limit the "Right" scan direction robust extremum margin, as shown by the indicator REM>.

The second set of gradient extrema values are located to the right of (and including) the selected edge ES', and are marked in a ranked list as gradient extrema values GEV-R1 through GEV-R5. The "-RXX" suffix indicates that these gradient extrema values are located on the right of the selected edge ES/ES'. It will be understood that these extrema are encountered along a "Left" scan direction that proceeds from the right end and toward the left along the gradient profile GP, up to and including the selected edge ES/ES'. These extrema are relevant to determining a second scan direction robust extremum margin that is a "Left" scan direction robust extremum margin REM<. The gradient extremum values GEV-R1 through GEV-R5 are shown as a ranked list, in that the values are ranked or ordered sequentially by value along the vertical axis.

By inspection, we see that all the gradient extremum values GEV-R1 through GEV-R5 fall inside the maximum range related to the robust extremum margin REM<, which in this particular example is related to the right neighbor extremum RNE. That is, in this particular example, the maximum range related to the robust extremum margin REM< is limited between L-SE=GEVsel=GEV-R5 and OL-RNE=GEV-nR=GEV-R1. The largest difference between sequential values in the ranked list is between GEV-R1 and GEV-R2. Therefore, in this particular embodiment, these are the two gradient extremum values that limit the "Right" scan direction robust extremum margin, as shown by the indicator REM<.

In various embodiments, the difference REM< may be compared to the difference REM>. In this particular example, REM> is larger. Therefore, it is selected as the basis for detecting the selected edge and the gradient threshold (e.g., THSP=−35.6) may be automatically set in the middle of the "Right" scan direction robust extremum margin REM>. The scan direction is set to the right. The Selected Edge Prominence Counter parameter/editing box may be automatically set to a corresponding value (e.g., "2"), according to previously outlined principles. The selected edge ES' is the first extremum encountered along the scan direction in its corresponding gradient prominence, in this example. The parameter set outlined above may be considered to robustly indicate the selected edge, despite reasonable variations in particular extrema value between workpieces and/or images, and despite the plurality of similar edges that are included in the video tool ROI.

FIG. 7, and the following description, are comparable to FIG. 6, in that the workpiece image 610 and the scan line gradient profile GP are identical. However, in the embodiment outlined below the same maximum range is used to determine each robust extremum margin. In particular, in the embodiment shown in FIG. 7, the opposing limit OL of the maximum range is not farther from the selected edge extremum value than the one of the two neighbor extremum gradient values that is closest to the gradient profile extremum value of the selected edge. In this particular example, the right neighbor extremum gradient value GEV-nR that is closer to the gradient profile extremum value GEVsel of the selected edge than the left neighbor extremum gradient value GEV-nL. Therefore, the maximum range related to both robust extremum margins REM> and REM< is limited between L-SE=GEVsel=GEV-R5=GEV-L10 and OL-RE=GEV-nR=GEV-R1.

By inspection, we see that the gradient extremum values GEV-L1 through GEV-L3 in the ranked list related to the scan direction robust extremum margin REM> fall outside the maximum range. The difference between GEV-L8 and GEV-L9 is the largest difference between sequential values remaining in that ranked list. Therefore, in this particular embodiment, these are the two gradient extremum values that limit the "Right" scan direction robust extremum margin, as shown by the indicator REM>. Regarding the "Left" scan direction robust extremum margin, all the gradient extremum values GEV-R1 through GEV-R5 fall inside the maximum range. The largest difference between sequential values in the ranked list is between GEV-R1 and GEV-R2. Therefore, these are the two gradient extremum values that limit the "Right" scan direction robust extremum margin, as shown by the indicator REM<.

In this particular example, REM> is larger than REM<. Therefore, it is selected as the basis for detecting the selected edge, and the gradient threshold (e.g., THSP=22.2) may be automatically set in the middle of the "Right" scan direction robust extremum margin REM>. The scan direction is set to the right. The Selected Edge Prominence Counter parameter/editing box may be automatically set to a corresponding value (e.g., "2"), according to previously outlined principles.

Because the maximum range is based on the one of the two neighbor extremum gradient values that is closest to the gradient profile extremum value of the selected edge, the selected edge ES' is the only extremum encountered along the scan direction in its corresponding gradient prominence, in this example. It should be appreciated that in such embodiments, the neighbor extremum that defines the maximum range need not precede the selected edge along the scan direction, although it may, depending on a particular instance of a gradient profile GP. In any case, the parameter set outlined above may be considered to robustly indicate the selected edge, despite reasonable variations in particular extrema value between workpieces and/or images, and despite the plurality of similar edges that are included in the video tool ROI.

Each of the Right and Left robust extremum margins described above are based on the two sequential gradient extremum values that exhibit the largest difference between sequential values in their ranked list. However, this embodiment is exemplary only, and not limiting. In other embodiments, multiple edge operations may include a minimum margin value or difference requirement that has been determined to provide stable results for reasonably expected workpiece and/or image variations, and any robust extremum margin that exceeds the minimum margin value or difference requirement and falls in the maximum range, may be used.

The principles and methods outlined above with reference to FIGS. 5, 6, and/or 7 may be implemented using known programming methods and/or signal processing circuits. For example, such operations may be performed automatically by the gradient profile analysis portion 143gpa and/or the gradient threshold portion 143gt and/or the gradient prominence counter 143gpc, previously outlined with reference to FIG. 2.

Figure 8A:
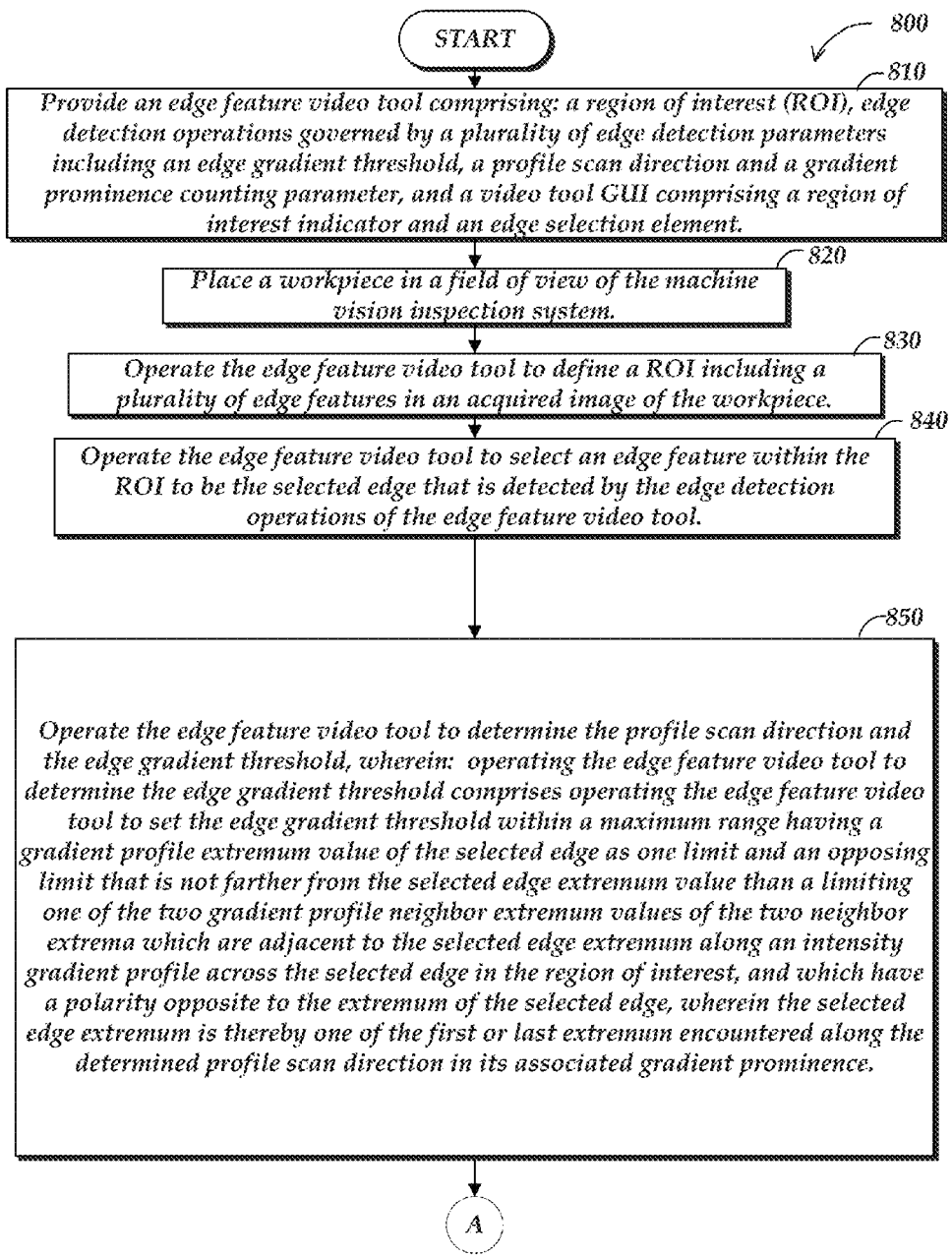
FIGS. 8A and 8B are flow diagrams showing a method and/or routine for improving the reliability of edge detection when discriminating between a plurality of edges in a region of interest of an edge feature video tool included in a machine vision inspection system.
Figure 8B:
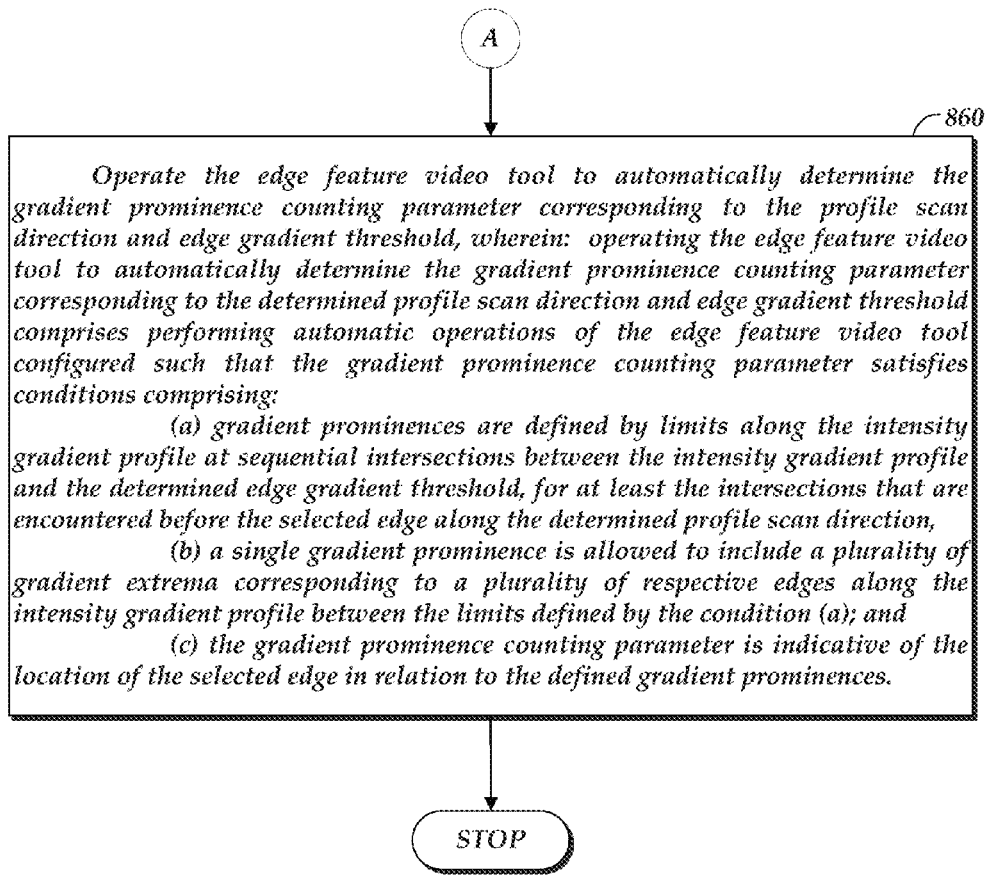

FIGS. 8A and 8B show a flow diagram 800 showing a method and/or routine for improving the reliability of edge detection when discriminating between a plurality of edges in a region of interest of an edge feature video tool included in a machine vision inspection system. The various embodiments of the general method or routine outlined below may be performed based on implementing various combinations of the related operations and/or elements disclosed previously herein.

At a block 810, an edge feature video tool is provided comprising: a region of interest (ROI), edge detection operations governed by a plurality of edge detection parameters including an edge gradient threshold, a profile scan direction and a gradient prominence-counting parameter, and a video tool GUI comprising a region of interest indicator and an edge selection element.

At a block 820, a workpiece is placed in a field of view of the machine vision inspection system.

At a block 830, the edge feature video tool is operated to define a ROI including a plurality of edge features in an acquired image of the workpiece.

At a block 840, the edge feature video tool is operated to select an edge feature within the ROI to be the selected edge that is detected by the edge detection operations of the edge feature video tool.

At a block 850, the edge feature video tool is operated to determine the profile scan direction and the edge gradient threshold. Operating the edge feature video tool to determine the edge gradient threshold comprises operating the edge feature video tool to set the edge gradient threshold within a maximum range having a gradient profile extremum value of the selected edge as one limit and an opposing limit that is not farther from the selected edge extremum value than a limiting one of the two gradient profile neighbor extremum values of the two neighbor extrema that are adjacent to the selected edge extremum along an intensity gradient profile across the selected edge in the region of interest, and that have a polarity opposite to the extremum of the selected edge.

As previously indicated, in some embodiments, the limiting one of the two neighbor extremum gradient values (that is, the one that limits the maximum range) is the one that is closest to the gradient profile extremum value of the selected edge. In such a case, the selected edge extremum may thereby be the only extremum encountered in its associated gradient prominence, which may allow good detection reliability with minimal additional signal processing to locate that extremum.

In other embodiments, the limiting one of the two neighbor extremum gradient values may be the one that corresponds to the neighbor extremum that is encountered before the selected edge along the determined profile scan direction, regardless of whether it is closest to the gradient profile extremum value of the selected edge. In such a case, the selected edge extremum may thereby be the first extremum encountered along the determined profile scan direction in its associated gradient prominence, which may allow good detection reliability with very simple signal processing to locate that extremum.

In other embodiments, the limiting one of the two neighbor extremum gradient values may be the one that corresponds to the neighbor extremum that is encountered after the selected edge along the determined profile scan direction, regardless of whether it is closest to the to the gradient profile extremum value of the selected edge. In such a case, the selected edge extremum may thereby be the last extremum encountered along the determined profile scan direction in its associated gradient prominence. However, this latter alternative may require relatively more complicated signal processing to locate that extremum, or may be considered less reliable in some applications After the block 850, the process continues to a reference marker A that is continued in FIG. 8B.

After the reference marker A in FIG. 8B, at a block 860, the edge feature video tool is operated to automatically determine the gradient prominence-counting parameter corresponding to the profile scan direction and edge gradient threshold. Operating the edge feature video tool to automatically determine the gradient prominence-counting parameter corresponding to the determined profile scan direction and edge gradient threshold comprises performing automatic operations of the edge feature video tool configured such that the gradient prominence-counting parameter satisfies conditions comprising: (a) gradient prominences are defined by limits along the intensity gradient profile at sequential intersections between the intensity gradient profile and the determined edge gradient threshold, for at least the intersections that are encountered before the selected edge along the determined profile scan direction, (b) a single gradient prominence is allowed to include a plurality of gradient extrema corresponding to a plurality of respective edges along the intensity gradient profile between the limits defined by the condition (a); and (c) the gradient prominence-counting parameter is indicative of the location of the selected edge in relation to the defined gradient prominences. After the block 860, the process ends.

It will be appreciated that the various methods and operations disclosed above may be performed, and associated user interface features may be displayed, according to a learn mode of operation. Parameters determined in the method may then be saved in a part program for future use on a similar workpieces. Of course the methods may also, or alternatively, be implemented for automatic run time execution in part programs, in various embodiments.

While various embodiments of the invention have been illustrated and described, numerous variations in the illustrated and described arrangements of features and sequences of operations will be apparent to one skilled in the art based on this disclosure. Thus, it will be appreciated that various changes can be made therein without departing from the spirit and scope of the invention.

The embodiments of the invention in which an exclusive property or privilege is claimed are defined as follows:

1. A method for improving the reliability of edge detection when discriminating between a plurality of edges in a region of interest of an edge feature video tool included in a machine vision inspection system, the method comprising:
   providing an edge feature video tool comprising: a region of interest (ROI), edge detection operations governed by a plurality of edge detection parameters including an edge gradient threshold, a profile scan direction and a gradient prominence-counting parameter, and a video tool GUI comprising a region of interest indicator and an edge selection element;
   placing a workpiece in a field of view of the machine vision inspection system;
   operating the edge feature video tool to define a ROI including a plurality of edge features in an acquired image of the workpiece;
   operating the edge feature video tool to select an edge feature within the ROI to be the selected edge that is detected by the edge detection operations of the edge feature video tool;
   operating the edge feature video tool to determine the profile scan direction and the edge gradient threshold; and
   operating the edge feature video tool to automatically determine the gradient prominence-counting parameter corresponding to the profile scan direction and edge gradient threshold,
   wherein:
      operating the edge feature video tool to determine the edge gradient threshold comprises operating the edge feature video tool to set the edge gradient threshold within a maximum range having a gradient profile extremum value of the selected edge as one limit and an opposing limit that is not farther from the selected edge extremum value than a limiting one of the two gradient profile neighbor extremum values of the two neighbor extrema that are adjacent to the selected edge extremum along an intensity gradient profile across the selected edge in the region of interest and that have a polarity opposite to the extremum of the selected edge, and
      operating the edge feature video tool to automatically determine the gradient prominence-counting parameter corresponding to the determined profile scan direction and edge gradient threshold comprises performing automatic operations of the edge feature video tool configured such that the gradient prominence-counting parameter satisfies conditions comprising:
      (a) gradient prominences are defined by limits along the intensity gradient profile at sequential intersections between the intensity gradient profile and the determined edge gradient threshold, for at least the intersections that are encountered before the selected edge along the determined profile scan direction;
      (b) a single gradient prominence is allowed to include a plurality of gradient extrema corresponding to a plurality of respective edges along the intensity gradient profile between the limits defined by the condition (a); and
      (c) the gradient prominence-counting parameter is indicative of the location of the selected edge in relation to the defined gradient prominences.

2. The method of claim 1, wherein the edge feature video tool includes operations that automatically prevent the edge gradient threshold from being set to a value within a gradient noise band that includes the gradient value zero.

3. The method of claim 2, wherein:
   when if the limiting one of the two gradient profile neighbor extremum values falls within the gradient noise band, then the opposing limit of the maximum range is defined to be not farther from the selected edge extremum value than a limit of the gradient noise band that is closest to the selected edge extremum value.

4. The method of claim 1, wherein:
   operating the edge feature video tool to set the edge gradient threshold within the maximum range comprises setting the edge gradient threshold within a robust extremum margin included in the maximum range, wherein the robust extremum margin satisfies defining conditions comprising:
   (a) the robust extremum margin is limited by first and second gradient extremum values that would be sequential values in a ranked list of gradient extremum values corresponding to gradient extrema in the intensity gradient profile that are included in the maximum range and that are encountered before and including the selected edge along the determined profile scan direction; and
   (b) the first and second gradient extremum values that limit the robust extremum margin are sequential values that exhibit one of (b1) the largest difference between sequential values in the ranked list, and (b2) a difference that exceeds a minimum margin value defined in the edge feature video tool.

5. The method of claim 4, wherein the limiting one of the two neighbor extremum gradient values is the one that is closest to the gradient profile extremum value of the selected edge.

6. The method of claim 4, wherein the limiting one of the two neighbor extremum gradient values is the one that corresponds to the neighbor extremum that is encountered before the selected edge along the determined profile scan direction.

7. The method of claim 4, wherein the method comprises performing operations of the edge feature video tool that are configured to automatically determine a robust extremum margin that satisfies the defining conditions.

8. The method of claim 7, wherein the first and second gradient extremum values that limit the robust extremum margin are the sequential values that exhibit the largest difference between sequential values in the ranked list.

9. The method of claim 7, further comprising displaying the automatically determined robust extremum margin overlaying a displayed intensity gradient profile in the video tool GUI.

10. The method of claim 7, wherein operating the edge feature video tool to set the edge gradient threshold within the robust extremum margin comprises automatically setting the edge gradient threshold within the automatically determined robust extremum margin.

11. The method of claim 7, wherein:
the operations that are configured to automatically determine the robust extremum margin include determining first and second profile scan direction robust extremum margins that satisfy conditions comprising:
(a) the first profile scan direction robust extremum margin is limited by first and second gradient extremum values that would be sequential values in a first ranked list of gradient extremum values corresponding to gradient extrema in the intensity gradient profile that are encountered before and including the selected edge along the first profile scan direction and that are included in a first maximum range, and the first and second gradient extremum values that limit the first profile scan direction robust extremum margin are the sequential values that exhibit the largest difference between sequential values in the first ranked list; and
(b) the second profile scan direction robust extremum margin is limited by first and second gradient extremum values that would be sequential values in a second ranked list of gradient extremum values corresponding to gradient extrema in the intensity gradient profile that are encountered before and including the selected edge along the second profile scan direction and that are included in a second maximum range, and the first and second gradient extremum values that limit the second profile scan direction robust extremum margin are the sequential values that exhibit the largest difference between sequential values in the second ranked list;
operating the edge feature video tool to set the edge gradient threshold within the robust extremum margins comprises selecting one of the first and second robust extremum margins and setting the edge gradient threshold within the selected one; and
operating the edge feature video tool to determine the profile scan direction comprises setting the profile scan direction to the first profile scan direction when the first robust extremum margin is selected and the second profile scan direction when the second robust extremum margin is selected.

12. The method of claim 11, further comprising displaying the first and second robust extremum margins overlaying a displayed intensity gradient profile in the video tool GUI, wherein selecting one of the first and second robust extremum margins comprises manually selecting at least one of (a) one of the displayed first and second edge robust extremum margins, and (b) one of the first and second profile scan directions corresponding to the displayed first and second robust extremum margins.

13. The method of claim 11, wherein:
selecting one of the first and second robust extremum margins comprises automatically selecting the larger one of the first and second robust extremum margins; and
setting the edge gradient threshold within the selected robust extremum margin comprises automatically setting the edge gradient threshold within the automatically selected robust extremum margin.

14. The method of claim 11, wherein the first maximum range and the second maximum range fulfill one of the conditions: (a) the first and second maximum range are the same maximum range, and the opposing limit of that maximum range is not farther from the selected edge extremum value than the one of the two neighbor extremum gradient values that is closest to the gradient profile extremum value of the selected edge, and (b) the first maximum range is determined based on the gradient value of a first neighbor extremum that is encountered before the selected edge along the first profile scan direction, and the second maximum range is determined based on the gradient value of a second neighbor extremum that is encountered before the selected edge along the second profile scan direction.

15. The method of claim 1, further comprising displaying an edge gradient threshold indicator corresponding to a current value of the edge gradient threshold overlaying a displayed intensity gradient profile in the video tool GUI.

16. The method of claim 15, wherein:
the displayed edge gradient threshold indicator is manually adjustable in the video tool GUI; and
operating the edge feature video tool to set the edge gradient threshold within the maximum range comprises manually adjusting the edge gradient threshold indicator.

17. The method of claim 1, wherein operating the edge feature video tool to set the edge gradient threshold within the maximum range comprises automatically setting the edge gradient threshold within the maximum range.

18. The method of claim 1, wherein the method is performed according to a learn mode of operation and parameters determined in the method are saved in a part program for future use on a similar workpiece.

19. The method of claim 1, wherein the video tool GUI comprises a detection robustness indicator that indicates a degree of risk associated with using the edge feature video tool to detect the selected edge feature based on a current set of the edge detection parameters, and the method further comprises displaying the detection robustness indicator in the video tool GUI.

20. The method of claim 19, further comprising displaying an edge gradient threshold indicator corresponding to a current value of the edge gradient threshold overlaying a displayed intensity gradient profile in the video tool GUI, wherein the detection robustness indicator comprises a color associated with the edge gradient threshold indicator.

* * * * *